US012724836B2

(12) United States Patent
Chu et al.

(10) Patent No.: US 12,724,836 B2
(45) Date of Patent: Sep. 1, 2026

(54) METHOD OF RECOMMENDING OBJECT, ELECTRONIC DEVICE, AND STORAGE MEDIUM

(71) Applicants: Beijing BOE Technology Development Co., Ltd., Beijing (CN); BOE TECHNOLOGY GROUP CO., LTD., Beijing (CN)

(72) Inventors: Xiao Chu, Beijing (CN); Zhenzhong Zhang, Beijing (CN); Ruixiang Chen, Beijing (CN); Xueda Bian, Beijing (CN); Jiangbo Liu, Beijing (CN); Junjie Zhao, Beijing (CN); Xinyin Wu, Beijing (CN); Honglei Zhang, Beijing (CN); Hongxiang Shen, Beijing (CN); Lirong Xu, Beijing (CN)

(73) Assignees: Beijing BOE Technology Development Co., Ltd., Beijing (CN); BOE TECHNOLOGY GROUP CO LTD., Beijing (CN)

( * ) Notice: Subject to any disclaimer, the term of this patent is extended or adjusted under 35 U.S.C. 154(b) by 318 days.

(21) Appl. No.: 18/552,269

(22) PCT Filed: Jan. 3, 2023

(86) PCT No.: PCT/CN2023/070065

§ 371 (c)(1),
(2) Date: Sep. 25, 2023

(87) PCT Pub. No.: WO2023/134496

PCT Pub. Date: Jul. 20, 2023

(65) Prior Publication Data

US 2024/0169006 A1 May 23, 2024

(30) Foreign Application Priority Data

Jan. 14, 2022 (CN) ......................... 202210046031.5

(51) Int. Cl.
*G06F 16/9535* (2019.01)
*H04L 9/00* (2022.01)

(52) U.S. Cl.
CPC ............ *G06F 16/9535* (2019.01); *H04L 9/50* (2022.05)

(58) Field of Classification Search
CPC ............................... G06F 16/9535; H04L 9/50
(Continued)

(56) References Cited

U.S. PATENT DOCUMENTS

2013/0290704 A1* 10/2013 Giniger ............... H04L 63/0823 713/156
2019/0074968 A1* 3/2019 Liu ....................... H04L 9/3247
(Continued)

FOREIGN PATENT DOCUMENTS

CN 107563833 A 1/2018
CN 108960863 A 12/2018
(Continued)

OTHER PUBLICATIONS

Chen, B. et al., "A Blockchain-Based Searchable Public-Key Encryption With Forward and Backward Privacy for Cloud-Assisted Vehicular Social Networks," IEEE Transactions on Vehicular Technology, vol. 69, No. 6, Jun. 2020, Digital Object Identifier 10.1109/TVT.2019.2959383.

(Continued)

*Primary Examiner* — Tony Mahmoudi
(74) *Attorney, Agent, or Firm* — Westman, Champlin & Koehler, P.A.

(57) ABSTRACT

A method of recommending an object, an electronic device, and a storage medium are provided. The method includes: determining, in response to receiving target user behavior data of a target user from a target client, a target object according to the target user behavior data and at least one candidate user behavior data corresponding to a plurality of candidate users; and sending the target object to the target client, so as to recommend the target object to the target user, (Continued)

where each of the candidate user behavior data is stored in a predetermined block chain, each of the candidate user behavior data corresponds to at least one of a plurality of block chain nodes contained in a block chain network, and each of the candidate user behavior data indicates a preference of a candidate user for at least one candidate object.

20 Claims, 7 Drawing Sheets

(58) Field of Classification Search
USPC .......................................................... 707/769
See application file for complete search history.

(56) References Cited

U.S. PATENT DOCUMENTS

2021/0157938 A1* 5/2021 Chen ....................... H04L 9/088
2021/0209491 A1* 7/2021 Liu .......................... G06N 5/04

FOREIGN PATENT DOCUMENTS

CN 109768987 A 5/2019
CN 110032876 A 7/2019
CN 112380859 A 2/2021
CN 113220734 A 8/2021
CN 113434771 A 9/2021
CN 113643103 A 11/2021
CN 114398553 A 4/2022

OTHER PUBLICATIONS

Yuanyuan, G. et al., “Research on the Uplink Mode of Traceability Data of Cross-borderTrade Blockchain,” IGITCW technology, Special Technology, dated 2020, doi: 10.3969/J.ISSN.1672-7274.2020.08.031.

* cited by examiner

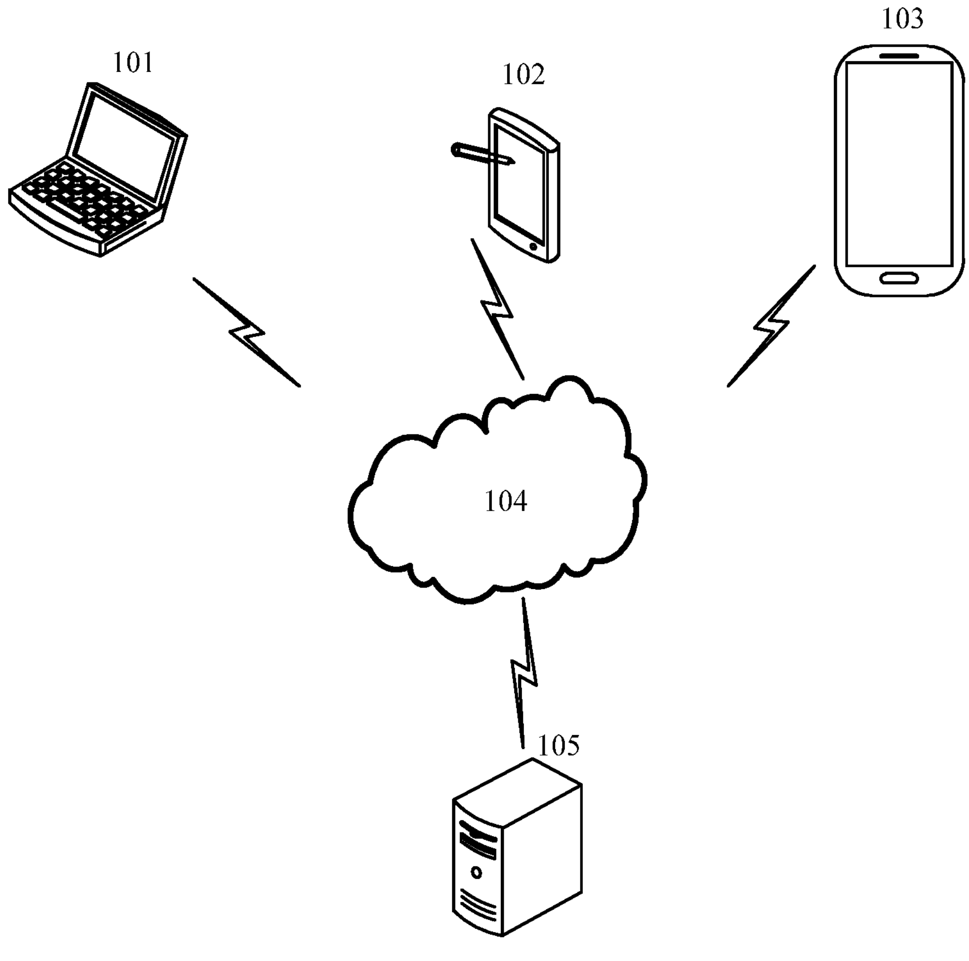

In response to target user behavior data of a target user being received from a target client, a target object is determined according to the target user behavior data and at least one candidate user behavior data corresponding to a plurality of candidate users

S220

The target object is sent to the target client so as to recommend the target object to the target user

FIG. 2

METHOD OF RECOMMENDING OBJECT, ELECTRONIC DEVICE, AND STORAGE MEDIUM

CROSS-REFERENCE TO RELATED APPLICATION(S)

This application is a Section 371 National Stage Application of International Application No. PCT/CN2023/070065, filed on Jan. 3, 2023, entitled "METHOD AND APPARATUS OF RECOMMENDING OBJECT, ELECTRONIC DEVICE, AND STORAGE MEDIUM", which published as WIPO Publication No. WO 2023/134496 A1, on Jul. 20, 2023, which claims priority to Chinese Application No. 202210046031.5, filed on Jan. 14, 2022, the contents of which are incorporated herein by reference in their entireties.

TECHNICAL FIELD

The present disclosure relates to a field of block chain and artificial intelligence technologies, in particular to a method of recommending an object, an electronic device, and a storage medium.

BACKGROUND

With a development of science and technology, a scale and coverage of Internet are increasingly larger, and an amount of information and data generated by the Internet shows an explosive growth. Due to an excessive amount of information, a user has to sift through information when surfing the Internet, spending time on information filtering and integration. An information overload is one of adverse effects of information abundance in an information age. In order to improve an efficiency of information utilization, a method of recommending an object may be used to achieve information filtering.

SUMMARY

In view of this, the present disclosure provides a method of recommending an object, an electronic device, and a storage medium.

In an aspect of the present disclosure, a method of recommending an object is provided, including: determining, in response to receiving target user behavior data of a target user from a target client, a target object according to the target user behavior data and at least one candidate user behavior data corresponding to a plurality of candidate users; and sending the target object to the target client, so as to recommend the target object to the target user, where each of the candidate user behavior data is stored in a predetermined block chain, each of the candidate user behavior data corresponds to at least one of a plurality of block chain nodes contained in a block chain network, and each of the candidate user behavior data indicates a preference of a candidate user for at least one candidate object.

In another aspect of the present disclosure, a method of recommending an object is provided, which is applied to a block chain network, where the block chain network includes a plurality of block chain nodes, and the plurality of block chain nodes include a block chain node corresponding to at least one personal client and a block chain node corresponding to at least one service client; the method includes: parsing, for each of the plurality of block chain nodes, in response to receiving at least one data upload request of at least one candidate user from a client corresponding to the block chain node, the at least one data upload request to obtain candidate user behavior data corresponding to the at least one candidate user; processing the candidate user behavior data corresponding to the at least one candidate user to generate a block corresponding to at least one candidate user behavior data; and storing at least one block in a predetermined block chain, so that a target object recommended to a target user is sent to a target client by a server, where the target object is determined by the server according to target user behavior data and at least one candidate user behavior data corresponding to a plurality of candidate users, and the target user behavior data is user behavior data of the target user received by the server from the target client.

In another aspect of the present disclosure, a method of recommending an object is provided, including: obtaining, for each client respectively corresponding to a plurality of block chain nodes in a block chain network, in response to a detection that a data upload operation for at least one candidate user corresponding to the client is triggered, candidate user behavior data corresponding to the at least one candidate user; generating a data upload request corresponding to the at least one candidate user according to the candidate user behavior data corresponding to the at least one candidate user; and sending at least one data upload request to the block chain node corresponding to the client so that the block chain node generates a block corresponding to at least one candidate user behavior data by using the at least one data upload request, and storing at least one block in a predetermined block chain so that a target object recommended to a target user is sent to a target client by a server, where the target object is determined by the server according to target user behavior data and at least one candidate user behavior data corresponding to a plurality of candidate users, and the target user behavior data is user behavior data of the target user received by the server from the target client.

In another aspect of the present disclosure, an electronic device is provided, including: one or more processors; and a memory configured to store one or more programs, where the one or more programs, when executed by the one or more processors, are configured to cause the one or more processors to implement the methods described above in the present disclosure.

In another aspect of the present disclosure, a computer-readable storage medium having computer instructions therein is provided, and the instructions, when executed by a processor, are configured to cause the processor to implement the methods described above in the present disclosure.

BRIEF DESCRIPTION OF THE DRAWINGS

The above and other objectives, features and advantages of the present disclosure will be more apparent through the following descriptions of embodiments of the present disclosure with reference to the accompanying drawings, in which:

FIG. 1 schematically shows an exemplary system architecture to which a method of recommending an object may be applied according to embodiments of the present disclosure;

FIG. 2 schematically shows a flowchart of a method of recommending an object according to embodiments of the present disclosure;

DETAILED DESCRIPTION OF EMBODIMENTS

Figure 3:
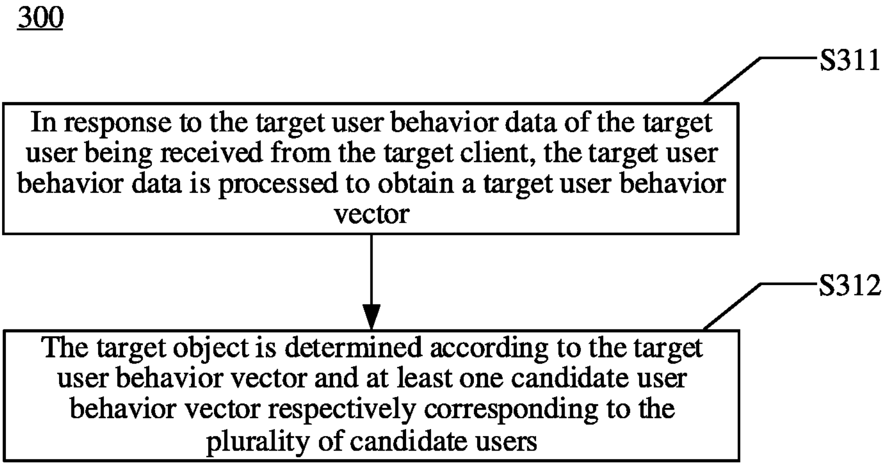
FIG. 3 schematically shows a flowchart of determining a target object according to target user behavior data and at least one candidate user behavior data corresponding to a plurality of candidate users.

Embodiments of the present disclosure will be described below with reference to the accompanying drawings. It should be understood, however, that these descriptions are merely exemplary and are not intended to limit the scope of the present disclosure. In the following detailed description, for ease of interpretation, many specific details are set forth to provide a comprehensive understanding of embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

Terms used herein are for the purpose of describing specific embodiments only and are not intended to limit the present disclosure. The terms "including", "containing", etc. used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to "at least one of A, B and C", it should be explained according to the meaning of the expression generally understood by those skilled in the art (for example, "a system including at least one of A, B and C" should include but not be limited to a system including A alone, a system including B alone, a system including C alone, a system including A and B, a system including A and C, a system including B and C, and/or a system including A, B and C). In a case of using the expression similar to "at least one of A, B or C", it should be explained according to the meaning of the expression generally understood by those skilled in the art (for example, "a system including at least one of A, B or C" should include but not be limited to a system including A alone, a system including B alone, a system including C alone, a system including A and B, a system including A and C, a system including B and C, and/or a system including A, B and C).

Embodiments of the present disclosure provide a block chain-based solution of recommending an object. In response to target user behavior data of a target user being received from a target client, a target object is determined according to the target user behavior data and at least one candidate user behavior data corresponding to a plurality of candidate users. The target object is sent to the target client, so as to recommend the target object to the target user. Each candidate user behavior data is stored in a predetermined block chain. Each candidate user behavior data corresponds to at least one of a plurality of block chain nodes in a block chain network. Each candidate user behavior data indicates a preference of a candidate user on at least one candidate object.

For ease of understanding, related concepts involved in the embodiments of the present disclosure will be described below.

A block chain is a solution that validates and stores data using a block chain data structure, generates and updates data using a distributed node consensus algorithm, ensures a security of data transmission and data access using cryptography, and collectively maintains a reliable database using a smart contract composed of automated script codes. Therefore, the block chain has basic characteristics such as openness, decentralization, information sharing, tamper resistance and traceability. The block chain may replace a reliance on a central server with blocks.

A block may be a container data structure that aggregates data included in the block chain. The block may include a block header and a block body. The block header may include version, timestamp, parent block hash, nonce, difficulty, and Merkle root. The timestamp may indicate a time when the block was created. The parent block hash may be used to refer to a previous block. The block body may include transaction details, transaction counter, and block size.

The smart contract is executable codes stored in the block chain. An execution condition and business processing logic of the smart contract are determined in the executable codes, that is, a condition for starting the smart contract and how to process a received business processing request after the smart contract is started are determined in the executable codes. After the smart contract is stored in the block chain, it is difficult to edit or modify the smart contract. For example, an execution of the smart contract may be triggered based on an event. For example, the execution of the smart contract may be recorded as a transaction on the block chain and recorded in the block chain.

The block chain may be classified into a public block chain, a private block chain, a consortium block chain or a hybrid block chain according to a network scope. The consortium block chain refers to a block chain with joint participation and management of several institutions, and each institution may run at least one block chain node. Only the institutions in the consortium block chain are allowed to read, write and trade data of the consortium block chain, an identity management system and an initiation of transaction or proposal based on PKI (Public Key Infrastructure) may be implemented by means of digital certificates, and a consensus is achieved by a co-signature verification of participates. In embodiments of the present disclosure, a type of the block chain may be determined according to actual service requirements, which is not limited here. For example, the block chain network is a consortium block chain.

A block chain network may include a plurality of block chain nodes. The block chain nodes communicate through P2P (Peer to Peer). A block chain node may be either a client or a server, that is, a block chain node may request services from other block chain nodes, or provide services to other block chain nodes or external applications.

FIG. 1 schematically shows an exemplary system architecture to which a method of recommending an object may be applied according to embodiments of the present disclosure. FIG. 1 is merely an example of the system architecture to which embodiments of the present disclosure may be applied, so as to help those skilled in the art understand technical contents of the present disclosure. However, it does not mean that embodiments of the present disclosure may not be applied to other devices, systems, environments or scenarios.

As shown in FIG. 1, a system architecture 100 according to such embodiments may include a server 101, a block chain network 102, and a client network 103. The block chain network 102 may include four block chain nodes, including block chain node 1021, block chain node 1022, block chain node 102_3 and block chain node 102_4. The client network 103 may include four clients, including client 1031, client 103_2, client 103_3 and client 103_4.

Any two of the four block chain nodes in the block chain network 102 are communicatively connected with each other. The block chain node corresponding to the client 103_1 is the block chain node 102_1. The block chain node corresponding to the client 103_2 is the block chain node 102_2. The block chain node corresponding to the client 103_3 is the block chain node 102_3. The block chain node corresponding to the client 103_4 is the block chain node 103_4.

The server 101 may be communicatively connected to the block chain network 102 and the client network 103 respectively.

The block chain node may be a client or a server. The client may be various electronic devices having display screens and supporting web browsing, including but not limited to smartphones, tablet computers, laptop computers, desktop computers, and the like. The server may be various types of servers providing various services. For example, the server may be a cloud server, also known as a cloud computing server or a cloud host, which is a host product in a cloud computing service system to solve shortcomings of difficult management and weak service scalability existing in an existing physical host and VPS (Virtual Private Server) service. The server may also be an edge server. The server may also be a server of a distributed system or a server combined with a block chain.

The client 1031, the client 1032, the client 103_3 and the client 103_4 may be various electronic devices having display screens and supporting web browsing, including but not limited to smartphones, tablet computers, laptop computers, desktop computers, and the like.

For example, in response to a detection that a data upload operation for at least one candidate user corresponding to the client 103_1 is triggered, the client 103_1 obtains candidate user behavior data corresponding to the at least one candidate user, generates at least one data upload request respectively corresponding to the at least one candidate user according to the candidate user behavior data respectively corresponding to the at least one candidate user.

In response to receiving the at least one data upload request of the at least one candidate user from the client 1031, the block chain node 102_1 parses the at least one data upload request to obtain the candidate user behavior data respectively corresponding to the at least one candidate user, processes the candidate user behavior data corresponding to the at least one candidate user to generate at least one block corresponding to the at least one candidate user behavior data, and storing the at least one block in a predetermined block chain.

In response to receiving target user behavior data of a target user from the target client 1032, the server 101 determines a target object according to the target user behavior data and at least one candidate user behavior data corresponding to a plurality of candidate users, and sends the target object to the target client 1032, so as to recommend the target object to the target user.

FIG. 2 schematically shows a flowchart of a method of recommending an object according to embodiments of the present disclosure.

As shown in FIG. 2, a method 200 includes operation S210 to operation S220.

In operation S210, in response to target user behavior data of a target user being received from a target client, a target object is determined according to the target user behavior data and at least one candidate user behavior data corresponding to a plurality of candidate users.

In operation S220, the target object is sent to the target client so as to recommend the target object to the target user.

According to embodiments of the present disclosure, each candidate user behavior data may be stored in a predetermined block chain. Each candidate user behavior data may correspond to at least one of a plurality of block chain nodes in a block chain network. Each candidate user behavior data may indicate a preference of a candidate user for at least one candidate object.

According to embodiments of the present disclosure, a client may be classified into different types of clients according to different classification perspectives. For example, according to a service function provided by the client, the client may be classified into a personal client or a service client, the personal client may refer to a client on which a user consumes using a function provided by the client, and the service client may refer to a client that supports the user to perform transaction services. According to a development framework of the client, the client may be classified into a program client or a webpage client, the program client may refer to a client that loads an application (APP), and the webpage client may refer to a web client, which may include a web browser. According to whether the user has performed a registration operation, the client may be classified into a registered client or a non-registered client, the registered client may refer to a client on which the user performs a registration operation in a process of using at least one of a function provided by the client or a function provided by an application loaded on the client, and the non-registered client may refer to a client on which the user performs no registration operation in a process of using the function provided by the client and the function provided by the application loaded on the client. The program client may be a personal client, a service client, a registered client, or a non-registered client. The webpage client may be a personal client, a service client, a registered client, or a non-registered client.

According to embodiments of the present disclosure, the target user may refer to a user who needs an object recommendation. The target user has target user behavior data corresponding to the target user. The candidate user may refer to a user who is involved in an operation of determining the target object. Each candidate user may have at least one candidate user behavior data corresponding to the candidate user. Each candidate user may be associated with the candidate user behavior data corresponding to the candidate user. A plurality of candidate users may be involved in the operation of determining the target object. Each candidate user may have at least one candidate user behavior data.

According to embodiments of the present disclosure, both the candidate user behavior data and the target user behavior data may include at least one dimension. The candidate user behavior data and the target user behavior data may include a same number of dimensions. Each dimension may correspond to a candidate object. The candidate user behavior data may include user behavior data for at least one candidate object. One or more dimensions in the candidate user behavior data and the target user behavior data may be null. That is, the user behavior data of the candidate user corresponding to the candidate user behavior data for one or more candidate objects is not obtained.

According to embodiments of the present disclosure, the target user behavior data may include user behavior data for at least one candidate object. The candidate user behavior data may indicate a preference of a candidate user for at least one candidate object. The target user behavior data may indicate a preference of the target user for at least one candidate object. The preference may be represented by an evaluation value. For example, the evaluation value may be a non-negative number greater than or equal to 0 and less than or equal to 1.

According to embodiments of the present disclosure, the at least one candidate object may include at least one of a user-related object, an item-related object, or a client-related object. The user-related object may include at least one of a user attribute information, a user social information, or a user credit information. The item-related object may include at least one of an item attribute information or an item function information. The client-related object may include at least one of a client attribute information, a client function information, a client credit information, a client user information, or a client media information.

According to embodiments of the present disclosure, the user attribute information may include at least one of a user identification information or a user auxiliary information. The user identification information may include at least one of a user name, a user identify number, or an IP address (Internet Protocol Address). The user auxiliary information may include a current location information, a user gender, a user native place, a user age, a user weight, a birthday constellation, a user specialty, or a frequent activity location of user. The user interaction information may include at least one of a user browsing record, a user order record, or a user social information. The user social information may include at least one of follow, reward, comment, bullet screen, like, favorite, share, or forward. The user credit information may be represented by a credit rating of user.

According to embodiments of the present disclosure, the item attribute information may include at least one of an item identification information or an item auxiliary information. The item identification information may include at least one of an item name or an item barcode. The item auxiliary information may include at least one of an item type, an item price, an item ingredient, an item standard number, an item manufacturer, an item origin, an item sales location, an item production date, or an item shelf life. The item function information may refer to a function of the item. For example, the item function information includes at least one selected from: the item has native function, the item has asset-backed function, or the item has non-fungible function.

According to embodiments of the present disclosure, the client attribute information may include a client identification information. The client identification information may include a client name, a MAC (Media Access Control) address of client, and an IP address of client. The client function information may refer to a function that the client may provide. For example, the client function information includes at least one selected from: the client focuses on native function, the client focuses on asset-backed function, or the client focuses on non-fungible function. The client credit information may be represented by a credit rating of client. The client user information may refer to an information related to a user using the client. The client user information may include at least one of a user group of client, a frequency of use of client, and a time period of use of client. The client media information may refer to a media information related to the client. The client media information may include at least one of a news type, a news keyword, or a number of news viewers.

According to embodiments of the present disclosure, according to whether the data may be used for trading or not, the user behavior data may be classified into tradable data or non-tradable data. The tradable data may refer to data that requires a user authorization to participate in an object recommendation. The non-tradable data may refer to data that may participant in an object recommendation without user authorization. For example, the tradable data may include confidential data.

According to embodiments of the present disclosure, the tradable data may be divided into a plurality of tradable levels according to a usage permission of the tradable data. That is, the tradable data may include a plurality of tradable levels. Each tradable data may have a tradable level corresponding to the tradable data. Different tradable levels have different usage permissions. For example, the higher the tradable level of the tradable data, the greater the usage permission of the tradable data.

For example, the tradable data includes four tradable levels, including a first tradable level, a second tradable level, a third tradable level, and a fourth tradable level. The usage permissions of the first tradable level, the second tradable level, the third tradable level and the fourth tradable level increase sequentially. If the tradable level of the tradable data is the first tradable level, the tradable level may have a usage permission to use at least one of the user attribute information, the item attribute information or the client attribute information included in the tradable data. If the tradable level of the tradable data is the second tradable level, the tradable level may further have a usage permission to use at least one of the user social information, the client function information or the client media information on the basis of having the usage permission of the first tradable level. If the tradable level of the tradable data is the third tradable level, the tradable level may further have a usage permission to use at least one of the user credit information or the client credit information on the basis of having the usage permissions of the first tradable level and the second tradable level. If the tradable level of the tradable data is the fourth tradable level, the tradable level may further have a usage permission to use the client user information on the basis of having the usage permissions of the first tradable level, the second tradable level and the third tradable level.

According to embodiments of the present disclosure, the tradable data may include at least one of personal tradable data and non-personal tradable data.

According to embodiments of the present disclosure, the personal tradable data may refer to tradable data of the user. The non-personal tradable data may refer to tradable data of other users. Other users may include users associated with the user. The personal tradable data may include at least one tradable level. The non-personal tradable data may include at least one tradable level. A relationship between the tradable level of the personal tradable data and the tradable level of the non-personal tradable data may be determined according to actual service needs, which is not limited here. For example, a minimum tradable level of the personal tradable data may be higher than a maximum tradable level of the non-personal tradable data. Alternatively, a maximum tradable level of the personal tradable data may be lower than a minimum tradable level of the non-personal tradable data. Alternatively, part of tradable levels of the personal tradable data may be higher than part of tradable levels of the non-personal tradable data.

According to embodiments of the present disclosure, if the user behavior data is target user behavior data, the tradable data included in the target user behavior data may be referred to as target tradable data. The target tradable data may refer to data that requires an authorization of the target user to participate in the object recommendation. The target tradable data may include a plurality of tradable levels. The target tradable data may include at least one of target personal tradable data or target non-personal tradable data. If the user behavior data is candidate user behavior data, the tradable data included in the candidate user behavior data may be referred to as candidate tradable data. The candidate tradable data may refer to data that requires an authorization of the candidate user to participate in the object recommendation. The candidate tradable data may include a plurality of tradable levels. The candidate tradable data may include at least one of candidate personal tradable data or candidate non-personal tradable data.

According to embodiments of the present disclosure, the user may be classified into a registered user or a non-registered user according to whether the user has performed a registration operation. The registered user may refer to a user who has performed a registration operation. The non-registered user may refer to a user who has not performed a registration operation. The registered user may include an anonymous registered user and a non-anonymous registered user. The anonymous registered user may refer to a user who has performed a registration operation without a real user information. The non-anonymous registered user may refer to a user who has performed a registration operation with a real user information.

According to embodiments of the present disclosure, one of the candidate user and the target user may include a non-registered user. That is, the candidate user may include a non-registered user, the target user may include a non-registered user, or both the candidate user and the target user may include non-registered users. In addition, the candidate user may also include a registered user, and the target user may also include a registered user.

According to embodiments of the present disclosure, the predetermined block chain may store at least one candidate user behavior data of the plurality of candidate users. The predetermined block chain may be obtained by processing the received candidate user behavior data of the candidate user using the plurality of block chain nodes included in the block chain. Each candidate user behavior data may correspond to at least one of the plurality of block chain nodes, that is, each candidate user behavior data may be stored in the predetermined block chain by at least one of the block chain nodes. The target user behavior data may be stored in the predetermined block chain, that is, the block chain node corresponding to the target client may store the target user behavior data in response to receiving a data upload request of the target user from the target client.

According to embodiments of the present disclosure, the server may receive the target user behavior data from the target client. For example, the server may send an executable file to the target client so that the target client may invoke the executable file in response to a detection that a data upload operation for the target user behavior data of the target user is triggered, and acquire the target user behavior data of the target user using the executable file. The executable file may be determined by the server according to an event tracking strategy. The event tracking strategy may refer to a strategy of how to collect user behavior data. The executable file may include a routine needed to collect user behavior data. A file format of the executable file may include JSON (JavaScript Object Notation).

For example, the target client may be a target web browser. The server sends the executable file to the target web browser. The target web browser may store the executable file locally. For example, the target web browser may store the executable file in a browser cache and a target folder corresponding to the target web browser. The target web browser may detect whether the data upload operation for the target user behavior data of the target user is triggered. For example, whether the data upload operation is triggered may include whether a confirmation control of agreeing to a target authorization protocol is triggered. The target authorization protocol may be a protocol for exchanging exchangeable data for object recommendation. The target authorization protocol may be acquired through a target plug-in. The target plug-in may be deployed to the target web browser. In response to a detection that the confirmation control of agreeing to the target authorization protocol is triggered, the target web browser may invoke the executable file, and acquire the target user behavior data using the executable file.

According to embodiments of the present disclosure, the routine included in the executable file may include a text recognition model. The text recognition model may be obtained by training a predetermined neural network model using training samples. The routine may include a name of variable, such as username/password/history/time. Acquiring the target user behavior data of the target user using the executable file may include: determining that predetermined data related to the target user behavior data is contained in data corresponding to the IP address of the browser by using the name of variable in the routine included in the executable file. For example, the predetermined data includes data related to a predetermined page, and the predetermined page may include a shopping page. The target user behavior data may be acquired using the text recognition model in the routine included in the executable file. The target user behavior data may be packaged using the executable file, so as to obtain a target data packet. The target web browser sends the target data packet including the target user behavior data to the server.

According to embodiments of the present disclosure, when obtaining the target user behavior data, the server may determine the target object from at least one candidate object according to the target user behavior data and at least one candidate user behavior data respectively corresponding to a plurality of candidate users. For example, the target object may be determined from the at least one candidate object based on a recommendation algorithm of the user according to the target user behavior data and the at least one candidate user behavior data respectively corresponding to the plurality of candidate users.

According to embodiments of the present disclosure, determining the target object from the at least one candidate object according to the target user behavior data and the at least one candidate user behavior data respectively corresponding to the plurality of candidate users may include: processing the target user behavior data to obtain first user behavior data; processing the at least one candidate user behavior data respectively corresponding to the plurality of candidate users to obtain at least one second user behavior data respectively corresponding to the plurality of candidate users; and determining the target object from the at least one candidate object according to the first user behavior data and the at least one second user behavior data respectively corresponding to the plurality of candidate users.

According to embodiments of the present disclosure, processing the target user behavior data to obtain the first user behavior data may include: determining the first user behavior data corresponding to a predetermined dimension from the target user behavior data. The predetermined dimension may include one or more dimensions. The predetermined dimensions may be configured according to actual service needs, which is not limited here. Alternatively, a standardization may be performed on the target user behavior data to obtain the first user behavior data. Alternatively, a vectorization may be performed on the target user behavior data to obtain a target user behavior vector, and the target user behavior vector may be determined as the first user behavior data.

According to embodiments of the present disclosure, processing the at least one candidate user behavior data respectively corresponding to the plurality of candidate users to obtain at least one second user behavior data respectively corresponding to the plurality of candidate users may include: for each candidate user behavior data, determining second user behavior data corresponding to the predetermined dimension from the candidate user behavior data. Alternatively, a standardization may be performed on the at least one candidate user behavior data respectively corresponding to the plurality of candidate users to obtain at least one second user behavior data respectively corresponding to the plurality of candidate users. Alternatively, a vectorization may be performed on each candidate user behavior data to obtain each candidate user behavior vector, and each candidate user behavior vector may be determined as each second user behavior data. According to embodiments of the present disclosure, the server determines the target object recommended to the target user according to the target user behavior data and the at least one candidate user behavior data corresponding to the plurality of candidate users. Each candidate user behavior data is stored in a predetermined block chain, and each candidate user behavior data corresponds to at least one of the plurality of block chain nodes included in the block chain network, so that the object recommendation is performed using traceable and highly credible data obtained by multi-source uploading, and an accuracy of the object recommendation may be improved.

According to embodiments of the present disclosure, the target user behavior data may include target tradable data. The target tradable data may be stored in the predetermined block chain. The block chain node corresponding to the target client stores the target tradable data in response to receiving a data upload request of the target user from the target client.

According to the embodiments of the present disclosure, for the description of the target tradable data, reference may be made to relevant parts above, and details will not be repeated here.

According to embodiments of the present disclosure, the at least one candidate object corresponding to the candidate user behavior data includes at least one of the client attribute information of the client corresponding to the candidate user behavior data, the client function information of the client corresponding to the candidate user behavior data, the client credit information of the client corresponding to the candidate user behavior data, or the item attribute information of the item corresponding to the candidate user behavior data.

According to embodiments of the present disclosure, for the description of the at least one candidate object corresponding to the candidate user behavior data, reference may be made to relevant parts above, and details will not be repeated here.

According to embodiments of the present disclosure, the plurality of block chain nodes may include a block chain node supporting a token transaction.

According to embodiments of the present disclosure, the token may include a native token and an asset-backed token. The native token may refer to an accounting unit attached to the block chain network and generated and used within the block chain network. The native token may also be referred to as built-in token. The asset-backed token may refer to an IOU issued by an issuer in the block chain network to represent a predetermined number of external assets or stakes. The external assets or stakes may include at least one of diamonds, paper gold, bonds, or stocks.

According to embodiments of the present disclosure, the token may further include a non-fungible token (NFT). The non-fungible token is a digital cryptocurrency that is indivisible, irreplaceable and unique. The non-fungible token provides a way to tokenize an ownership of native digital assets. The non-fungible token is a "unique" asset in a digital world, it may be bought and sold or used to represent an item in a real world, and it exists in an intangible way. If the user purchases a non-fungible token, the user obtains an indelible ownership record of the non-fungible token and the right to use the actual assets. For example, the non-fungible token may represent at least one of digital art, digital music, virtual real estate, virtual reality wearable apparatus, game assets, ticket, admission ticket, badge, block chain domain name, tokenized luxury goods, or tokenized insurance policy.

According to embodiments of the present disclosure, the plurality of block chain nodes in the block chain network may include a block chain node that supports a native token transaction and an asset-backed token transaction.

According to embodiments of the present disclosure, the plurality of block chain nodes in the block chain network may further include a block chain node that supports a non-fungible token transaction. The block chain node may be a membership-based NFT minting platform. It is possible to write the block chain node in a form of Ultrain. Ultrain is an intelligent block chain operating system that utilizes a multi-chain architecture system of main and side chains. Two consensus mechanisms are provided for the main and side chains, the main chain utilizes random trusted Byzantine consensus, and the side chain utilizes a random trusted stake mechanism.

According to embodiments of the present disclosure, the item having the native function may include that the item has a native token function, and the item having the asset-backed function may include that the item has an asset-backed token function.

According to embodiments of the present disclosure, a difference between risks and returns of different types of tokens is greater than a difference between risks and returns of the same type of tokens. Therefore, using the item having the native token function and the item having the asset-backed token function as candidate objects may help the user to select a more suitable token.

According to embodiments of the present disclosure, the item having the non-fungible function may include that the item has a non-fungible token function.

According to embodiments of the present disclosure, the client focusing on the native function may include that the client focuses on a native token function, and the client focusing on the asset-backed function may include that the client focuses on an asset-backed token function.

According to embodiments of the present disclosure, a degree of focusing may be represented by 0-100%. Using the client having the native token function and the client having the asset-backed token function as candidate objects may help the user to obtain a client that is more in line with a trading habit of the user for use.

According to embodiments of the present disclosure, the client focusing on the non-fungible function may include that the client focuses on a non-fungible token function.

According to embodiments of the present disclosure, the target object may include a plurality of candidate objects.

According to embodiments of the present disclosure, the target user may determine to "exchange tradable data for recommended target object" at one time, and the server may feed back the recommended target object at one time, so that a processing efficiency of the object recommendation may be improved.

According to embodiments of the present disclosure, the above-mentioned method of recommending the object may further include the following operations.

An object recommendation graph is generated according to target objects respectively corresponding to a plurality of time periods. The object recommendation graph is sent to the target client, so as to recommend the object recommendation graph to the target user.

According to embodiments of the present disclosure, for each of the plurality of time periods, it is possible to determine the target object corresponding to the time period using the method of recommending the object described in embodiments of the present disclosure, so that the target objects respectively corresponding to the plurality of time periods may be obtained.

According to embodiments of the present disclosure, after the target objects respectively corresponding to the plurality of time periods are obtained, an object recommendation graph may be generated according to the target objects respectively corresponding to the plurality of time periods. The object recommendation graph may indicate an association relationship between the target objects and the time periods.

According to embodiments of the present disclosure, the server may send the object recommendation graph to the target client, so that a change process on the user preference may be acquired by the target user according to the object recommendation graph.

According to embodiments of the present disclosure, there may be a plurality of target users.

According to embodiments of the present disclosure, operation S210 may include the following operations.

In response to target user behavior data of a plurality of target users being received from at least one target client, a batch processing is performed on a plurality of target user behavior data and at least one candidate user behavior data corresponding to a plurality of candidate users, so as to determine target objects respectively corresponding to the plurality of target users.

According to embodiments of the present disclosure, operation S220 may include the following operations.

The target objects respectively corresponding to the plurality of target users are sent to the at least one target client, so as to recommend the target objects respectively to the plurality of target users.

According to embodiments of the present disclosure, in a case of a plurality of target users, the target objects respectively corresponding to the plurality of target users may be processed in batches. Each target user may have target user behavior data corresponding to the target user and at least one candidate user behavior data corresponding to a plurality of candidate users. The plurality of target users may send their respective target user behavior data to the server through the same or different target clients.

According to embodiments of the present disclosure, in response to receiving the target user behavior data of the plurality of target users from the at least one target client, the server may perform a batch processing on sets of user behavior data respectively corresponding to the plurality of target users, so as to determine the target objects respectively corresponding to the plurality of target users. The set of user behavior data corresponding to each target user may include the target user behavior data corresponding to the target user and at least one candidate user behavior data of a plurality of candidate users corresponding to each target user behavior data.

According to embodiments of the present disclosure, the processing efficiency of the object recommendation may be improved by performing a batch processing on target objects respectively corresponding to a plurality of target users.

According to embodiments of the present disclosure, operation S210 may include the following operations.

In response to directly receiving the target user behavior data of the target user from the target client, the target object is determined according to the target user behavior data and the at least one candidate user behavior data corresponding to the plurality of candidate users.

According to embodiments of the present disclosure, the target client may send the target user behavior data of the target user directly to the server in a case that the target user agrees to exchange exchangeable data for the recommendation of target object.

According to embodiments of the present disclosure, when the target client sends the target user behavior data directly to the server, a data transfer may be effectively avoided and a data transmission may be more secure.

According to embodiments of the present disclosure, operation S210 may include the following operations.

In response to the target user behavior data of the target user being received from the target client through a block chain node corresponding to the target client, the target object is determined according to the target user behavior data and the at least one candidate user behavior data corresponding to the plurality of candidate users.

According to embodiments of the present disclosure, the target client may also send the target user behavior data of the target user to the server through the block chain node corresponding to the target client if the target user agrees to exchange the exchangeable data for the recommendation of target object.

According to the embodiment of the present disclosure, when the target client sends the target object to the server through the block chain node corresponding to the target client, it is possible to reduce a probability of data being cracked when an asymmetric encryption is cracked, and the security of data transmission may be improved.

According to embodiments of the present disclosure, operation S220 may include the following operations.

The target object is sent directly to the target client, so as to recommend the target object to the target user.

According to embodiments of the present disclosure, operation S220 may include the following operations.

The target object is sent to the target client through the block chain node corresponding to the target client, so as to recommend the target object to the target user.

According to embodiments of the present disclosure, the server may send the target object directly to the target client, or may send the target object to the block chain node corresponding to the target client so that the target object recommended to the target user may be sent to the target client by the block chain node corresponding to the target client.

According to embodiments of the present disclosure, the above-mentioned method of recommending the object may further include the following operations.

The target object is encrypted using a first public key to obtain a first encrypted target object.

According to embodiments of the present disclosure, sending the target object directly to the target client so as to recommend the target object to the target user may include the following operations.

The first encrypted target object is sent directly to the target client, so that the target client decrypts the first encrypted target object by using a first private key to obtain the target object recommended to the target user.

According to embodiments of the present disclosure, the first public key and the first private key may be generated by processing a user identification information of the target user by the target client using a first encryption algorithm. The first public key may be stored in the predetermined block chain by using the block chain node corresponding to the target client.

According to embodiments of the present disclosure, the user identification information may represent the user. The user identification information may include at least one of a user name or a user identity number. In addition, the user identification information may also include at least one of a user native place, a user gender, or a user age.

According to embodiments of the present disclosure, the first encryption algorithm may include an asymmetric encryption algorithm. For example, the asymmetric encryption algorithm may include an RSA algorithm, a DSA (Digital Signature Algorithm) algorithm, or a knapsack encryption algorithm.

According to embodiments of the present disclosure, the target client may generate the first public key and the first private key based on the first encryption algorithm according to the user identification information of the target user. The target client may send the first public key to the server. The server may encrypt the target object by using the first public key to obtain the first encrypted target object. After the first encrypted target object is obtained, the first encrypted target object may be sent to the target client, so that the target client may process the first encrypted target object by using the first private key to obtain the target object recommended to the target user.

According to embodiments of the present disclosure, the target client, the block chain node and the server jointly use a same encryption system, that is, the target client, the block chain node and the server all use the first public key and the first private key, so that a data transfer may be effectively avoided and a data transmission may be more secure.

According to embodiments of the present disclosure, the above-mentioned method of recommending the object may further include the following operations.

The target object is encrypted using a second public key to obtain a second encrypted target object.

According to embodiments of the present disclosure, sending the target object to the target client through the block chain node corresponding to the target client so as to recommend the target object to the target user may include the following operations.

The second encrypted target object is sent to the target client through the block chain node corresponding to the target client, so that the target client decrypts a third encrypted target object by using a third private key to obtain the target object recommended to the target user.

According to embodiments of the present disclosure, the third encrypted target object may be obtained by encrypting the target object, which is obtained by decrypting the second encrypted target object using a second private key, by the block chain node corresponding to the target client using a third public key. The second public key and the second private key may be generated by processing the user identification information of the target user by the block chain node corresponding to the target client using a second encryption algorithm. The third public key and the third private key may be generated by processing the user identification information of the target user by the target client using a third encryption algorithm.

According to embodiments of the present disclosure, both the second encryption algorithm and the third encryption algorithm may include an asymmetric encryption algorithm.

According to embodiments of the present disclosure, the target client may process the user identification information of the target user by using the third encryption algorithm to generate the third public key and the third private key. The target client may send the user identification information of the target user and the third public key to the block chain node corresponding to the target client. The block chain node corresponding to the target client may process the user identification information of the target user by using the second encryption algorithm to generate the second public key and the second private key. The block chain node corresponding to the target client may send the second private key to the target client.

According to embodiments of the present disclosure, the server may encrypt the target object by using the second public key to obtain the second encrypted target object. The second encrypted target object may be sent to the block chain node corresponding to the target client. The block chain node corresponding to the target client may decrypt the second encrypted target object by using the second private key to obtain the target object recommended to the target user. The block chain node corresponding to the target client may encrypt the target object by using the third public key to obtain a third encrypted target object. The block chain node corresponding to the target client may send the third encrypted target object to the target client. The target client may decrypt the third encrypted target object by using the third private key to obtain the target object.

According to embodiments of the present disclosure, the target client, the block chain node and the server use different encryption systems, that is, the third public key and the third private key are used for data transmission between the target client and the block chain node, and the second public key and the second private key are used for data transmission between the block chain node and the server. In this way, it is possible to reduce a probability of all data of the target client, the block chain node and the server being cracked when the encrypted data encrypted using an asymmetric encryption algorithm is cracked, and the security of data transmission may be improved.

Figure 4:
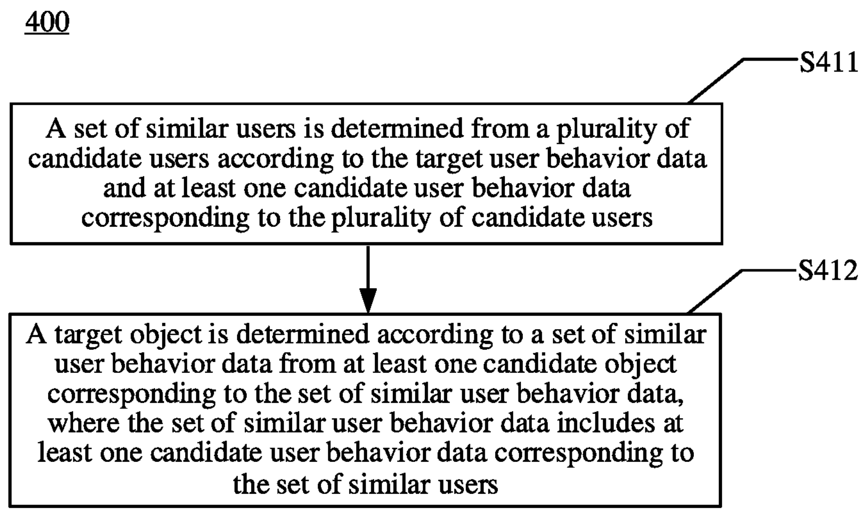
FIG. 4 schematically shows a flowchart of determining a target object according to target user behavior data and at least one candidate user behavior data corresponding to a plurality of candidate users according to other embodiments of the present disclosure.

Referring to FIG. 3 to FIG. 4, the method of recommending the object according to embodiments of the present disclosure will be further described in conjunction with specific embodiments.

FIG. 3 schematically shows a flowchart of determining a target object according to target user behavior data and at least one candidate user behavior data corresponding to a plurality of candidate users.

As shown in FIG. 3, a method 300 includes operation S311 to operation S312.

In operation S311, in response to the target user behavior data of the target user being received from the target client, the target user behavior data is processed to obtain a target user behavior vector.

In operation S312, the target object is determined according to the target user behavior vector and at least one candidate user behavior vector respectively corresponding to the plurality of candidate users. Each candidate user behavior vector is obtained by processing the candidate user behavior data corresponding to the candidate user behavior vector.

According to embodiments of the present disclosure, the candidate user behavior vector may be obtained by the server processing the candidate user behavior data. For example, a set of candidate user behavior vectors may be obtained by processing the candidate user behavior data corresponding to the candidate user behavior vectors using a feature extraction model. Alternatively, the set of candidate user behavior vectors may be obtained by processing the candidate user behavior data corresponding to the candidate user behavior vectors using a model-based recommendation algorithm.

According to embodiments of the present disclosure, after obtaining the target user behavior data, the server may encode the target user behavior data to obtain the target user behavior vector. Encoding may include unique encoding. A feature extraction may be performed on the target user behavior data to obtain the target user behavior vector. For example, the target user behavior data may be processed using a feature extraction model to obtain the target user behavior vector.

According to embodiments of the present disclosure, obtaining each candidate user behavior vector by processing the candidate user behavior data corresponding to the candidate user behavior vector may include the following operations.

Each candidate user behavior vector is obtained by processing the candidate user behavior data corresponding to the candidate user behavior vector using a model-based recommendation algorithm.

According to embodiments of the present disclosure, the model-based recommendation algorithm may include at least one of a matrix decomposition-based recommendation algorithm, an association rule-based recommendation algorithm, a cluster-based recommendation algorithm, or a graph-based recommendation algorithm.

According to embodiments of the present disclosure, the matrix decomposition-based recommendation algorithm may model the user and the object respectively by using vectors of latent features, and map the user and the object to their respective latent spaces, so that a user interaction with the object is modeled as an inner product of vectors. The matrix decomposition-based recommendation algorithm may include at least one of a recommendation algorithm based on singular value decomposition (SVD), a recommendation algorithm based on normalized singular value decomposition (i.e., Funk-SVD), a recommendation algorithm based on bias term-added singular value decomposition (i.e., Biased-SVD), a recommendation algorithm based on neighborhood information-incorporated singular value decomposition (i.e., SVD++), or a recommendation algorithm based on time information-added singular value decomposition (i.e., Time SVD++). The recommendation algorithm based on normalized singular value decomposition may also be referred to as a recommendation algorithm based on latent factor model (LFM).

According to embodiments of the present disclosure, obtaining each candidate user behavior vector by processing the candidate user behavior data corresponding to the candidate user behavior vector using a model-based recommendation algorithm may include the following operations.

Each candidate user behavior vector is determined according to a user latent factor matrix and an object latent factor matrix that are obtained when a predetermined condition is met. The user latent factor matrix and the object latent factor matrix that are obtained when the predetermined condition is met are obtained by adjusting an element value of an initial user latent factor matrix and an element value of an initial object latent factor matrix according to an output value. The output value is determined based on a predetermined objective function by using the initial user latent factor matrix, the initial object latent factor matrix and a real user behavior vector. The real user behavior vector is determined according to the candidate user behavior data.

According to embodiments of the present disclosure, the user latent factor matrix may include a plurality of first element values, and the first element value may represent an evaluation value for a latent factor from the user. The object latent factor matrix may include a plurality of second element values, and the second element value may represent an evaluation value for the candidate object from the latent factor.

According to embodiments of the present disclosure, the predetermined objective function may be determined according to actual service needs, which is not limited here. For example, the predetermined objective function may include a cost function. Alternatively, the predetermined objective function may include a cost function and a regularization term. The predetermined condition being met may mean that the output value converges or a number of solving rounds reaches a maximum number of rounds.

According to embodiments of the present disclosure, the real user behavior vector may be obtained by processing evaluation values respectively corresponding to at least one candidate object from the candidate user. It should be noted that, for the candidate user behavior data, there may be a lack of the evaluation value(s) for one or more candidate objects in the at least one candidate object included in the candidate user behavior data from the candidate user.

According to embodiments of the present disclosure, the real user behavior vector corresponding to the candidate user behavior data may be determined. The initial user latent factor matrix and the initial object latent factor matrix may be obtained based on a random initialization method. The output value may be obtained based on the predetermined objective function by using the initial user latent factor matrix, the initial object latent factor matrix and the real user behavior vector. The element value of the initial user latent factor matrix and the element value of the initial object latent factor matrix may be adjusted according to the output value until the predetermined condition is met. For example, an initial candidate user behavior vector may be obtained according to the initial user latent factor matrix and the initial object latent factor matrix. The initial candidate user behavior vector and the real user behavior vector may be input into the predetermined objective function to obtain the output value. Then, the element value of the initial user latent factor matrix and the element value of the initial object latent factor matrix may be adjusted according to the output value based on a least square method or a gradient descent method until the predetermined condition is met.

According to embodiments of the present disclosure, the candidate user behavior vector is determined according to the user latent factor matrix and the object latent factor matrix that are obtained when the predetermined condition is met. For example, the user latent factor matrix and the object latent factor matrix that are obtained when the predetermined condition is met may be multiplied to obtain a candidate user behavior matrix. The candidate user behavior vector may be determined according to the candidate user behavior matrix.

For example, the user latent factor matrix may be represented by $P_{m*k}$, the object latent factor matrix may be represented by $Q_{k*n}$, and the user behavior matrix may be represented by $R_{m*n}$. A relationship of the three may be determined according to Equation (1).

$$R_{m*n}=P_{m*k}Q_{k*n}^{*} \quad (1)$$

According to embodiments of the present disclosure, m represents the number of candidate users, n represents the number of candidate objects, k represents the number of latent factors, $P_{m*k}$ represent a user latent factor matrix with m rows and k columns, $Q_{k*n}$ represents an object latent factor matrix with k rows and n columns, and $R_{m*n}$ includes m×n user behavior vectors. According to embodiments of the present disclosure, the set of candidate user behavior vectors is obtained by processing the set of candidate user behavior data based on the latent factor model, so that a normalization of the candidate user behavior data may be achieved when the candidate user behavior data is sparse and scattered, and then the accuracy of object recommendation may be improved.

FIG. 4 schematically shows a flowchart of determining a target object according to target user behavior data and at least one candidate user behavior data corresponding to a plurality of candidate users according to other embodiments of the present disclosure.

As shown in FIG. 4, a method 400 includes operation S411 to operation S412.

In operation S411, a set of similar users is determined from a plurality of candidate users according to the target user behavior data and at least one candidate user behavior data corresponding to the plurality of candidate users.

In operation S412, a target object is determined according to a set of similar user behavior data from at least one candidate object corresponding to the set of similar user behavior data. The set of similar user behavior data includes at least one candidate user behavior data corresponding to the set of similar users.

According to embodiments of the present disclosure, the set of similar users may include at least one similar user. The similar user may refer to a user whose similarity with the target user meets a predetermined similarity condition. The target object may include at least one target object.

According to embodiments of the present disclosure, the set of similar users may be determined from the plurality of candidate users according to the target user behavior vector and at least one candidate user behavior vector corresponding to the plurality of candidate users based on a predetermined selection strategy. The predetermined selection strategy may include content of how to determine the set of candidate user behavior vectors according to the target user behavior vector and the set of candidate user behavior vectors. The target user behavior vector may be obtained by processing the target user behavior data. Each candidate user behavior vector is obtained by processing the candidate user behavior data corresponding to the candidate user behavior vector.

According to embodiments of the present disclosure, after the set of similar users is determined, it is possible to determine the set of similar user behavior data corresponding to the set of similar users. At least one target object is determined from a plurality of candidate objects included in the set of similar user behavior data. For example, for each of the plurality of candidate objects included in the set of similar user behavior data, an evaluation statistic value corresponding to the candidate object may be determined, so as to obtain a plurality of evaluation statistic values. At least one target object is determined from the plurality of candidate objects according to the plurality of evaluation statistic values. The evaluation statistic value may be obtained by processing at least one evaluation value corresponding to the candidate object in at least one set of similar user behavior data. The evaluation statistic value may include an evaluation mean, an evaluation maximum, or an evaluation median, etc.

According to embodiments of the present disclosure, determining at least one target object from the plurality of candidate objects according to the plurality of evaluation statistic values may include: sorting the plurality of candidate objects according to the plurality of evaluation statistic values to obtain a first sorting result; and determining at least one target object from the plurality of candidate objects according to the first sorting result. Sorting may include sorting in descending order of evaluation statistic value or sorting in ascending order of evaluation statistic value, which may be determined according to actual service needs and is not limited here. For example, in a case of sorting in descending order of evaluation statistic value, a first predetermined number of candidate objects ranked top or bottom may be determined from the plurality of candidate objects according to the first sorting result. The first predetermined number of candidate objects ranked top or bottom may be determined as at least one target object. Ranking top or bottom may be determined according to a relationship between a numerical value of the evaluation statistic value corresponding to the candidate object and a possibility of the candidate object being recommended. A value of the first predetermined number may be determined according to actual service needs, which is not limited here.

According to embodiments of the present disclosure, determining at least one target object from the plurality of candidate objects according to a plurality of evaluation statistic values may include: determining the at least one target object from the plurality of candidate objects according to the plurality of evaluation statistic values and a predetermined evaluation statistic threshold corresponding to the plurality of evaluation statistic values. For example, for each of the plurality of candidate objects, if it is determined that the larger the numeric value of the evaluation statistic value corresponding to the candidate object, the higher the possibility of the candidate object being recommended, then a candidate object may be determined as the target object when it is determined that the evaluation statistic value corresponding to the candidate object is greater than or equal to the evaluation statistic threshold corresponding to the predetermined evaluation statistic value. If it is determined that the smaller the numeric value of the evaluation statistic value corresponding to the candidate object, the higher the possibility of the candidate object being recommended, then a candidate object may be determined as the target object when it is determined that the evaluation statistic value corresponding to the candidate object is less than or equal to the predetermined evaluation statistic threshold corresponding to the candidate object. The predetermined evaluation statistic threshold may be determined according to actual service needs, which is not limited here.

According to embodiments of the present disclosure, operation S411 may include the following operations.

A similarity between the target user behavior data and each of the at least one candidate user behavior data corresponding to the plurality of candidate users is determined, so as to obtain a plurality of similarities. The set of similar users is determined from the plurality of candidate users according to the plurality of similarities.

According to embodiments of the present disclosure, determining the set of similar users from the candidate users according to the target user behavior vector and the set of candidate user behavior vectors corresponding to the candidate users may include the following operations.

A similarity between the target user behavior vector and each of the plurality of candidate user behavior vectors corresponding to the candidate users is determined, so as to obtain a plurality of similarities. The set of similar users is determined from the candidate users according to the plurality of similarities.

According to embodiments of the present disclosure, the similarity may indicate a degree of similarity between the candidate user and the target user. A relationship between the similarity and the degree of similarity may be determined according to actual service needs, which is not limited here. For example, the greater the similarity, the greater the degree of similarity. Alternatively, the greater the similarity, the less the degree of similarity. The similarity may include cosine similarity, Pearson correlation coefficient, Euclidean distance, or Jaccard distance.

According to embodiments of the present disclosure, determining the similarity between the target user behavior data and each of the at least one candidate user behavior data corresponding to the plurality of candidate users so as to obtain a plurality of similarities may include: determining a similarity between the target user behavior vector and each of the at least one candidate user behavior vector corresponding to the plurality of candidate users, so as to obtain a plurality of similarities.

According to embodiments of the present disclosure, for each of the plurality of candidate user behavior vectors, the similarity between the candidate user behavior vector and the target user behavior vector is determined so as to obtain a plurality of similarities. At least one target similarity may be determined from the plurality of similarities according to a similarity condition. The candidate users respectively corresponding to the at least one target similarity may be determined as similar users, so as to obtain the set of similar users. The similarity condition may include content of how to determine at least one target similarity from the plurality of similarities. The target similarity may refer to a similarity that meets a similarity condition. For example, the similarity condition may include that the similarity is greater than or equal to a similarity threshold. Alternatively, the similarity condition may include a second predetermined number of similarities ranked top or bottom.

According to embodiments of the present disclosure, determining the set of similar users from the plurality of candidate users according to the plurality of similarities may include the following operations.

The plurality of candidate users are sorted according to the plurality of similarities, so as to obtain a sorting result. A predetermined number of candidate users are determined from the plurality of candidate users as the set of similar users according to the sorting result.

According to embodiments of the present disclosure, the candidate users respectively corresponding to the plurality of similarities may be sorted according to the plurality of similarities, so as to obtain the second sorting result. Then, the second predetermined number of candidate users may be determined from the plurality of candidate users according to the second sorting result. Sorting may include sorting in ascending order of similarity or sorting in descending order of similarity. For example, if the greater the similarity, the greater the degree of similarity, then the second predetermined number of candidate users ranked bottom may be determined as similar users in a case of sorting in ascending order of similarity. The aforementioned second predetermined number may refer to a predetermined number. The second sorting result may refer to a sorting result. A value of the second predetermined number may be determined according to actual service needs, which is not limited here. For example, the second predetermined number may be three.

According to embodiments of the present disclosure, determining the set of similar users from the plurality of candidate users according to the plurality of similarities may include the following operations.

The set of similar users is determined from the plurality of candidate users according to a predetermined similarity threshold and the plurality of similarities.

According to embodiments of the present disclosure, the predetermined similarity threshold may be used as one of bases for determining the set of similar users from the plurality of candidate users. A value of the predetermined similarity threshold may be determined according to actual service needs, which is not limited here. For example, the predetermined similarity threshold may be 0.8.

According to embodiments of the present disclosure, for each of the plurality of similarities, when it is determined that the similarity is greater than or equal to the predetermined similarity threshold, the candidate user corresponding to the similarity may be determined as a similar user.

According to embodiments of the present disclosure, the above-mentioned method of recommending the object may further include the following operations.

In response to a data optimization request being received, the target user behavior data and the at least one candidate user behavior data corresponding to the plurality of candidate users are optimized according to a data optimization mode indicated by the data optimization request, so as to determine the target object recommended to the target user according to the optimized target behavior data and the optimized candidate user behavior data.

According to embodiments of the present disclosure, the data optimization request may refer to a request for optimizing user behavior data. The data optimization request may be generated by the client according to the data optimization mode. The data optimization mode may be determined by the client in response to a detection that a data upload operation is triggered. The data upload operation may include a click operation on the confirmation control of agreeing to the target authorization protocol or a selection operation of agreeing to the target authorization protocol.

According to embodiments of the present disclosure, the data optimization request may include a data optimization identification. The data optimization identification may indicate the data optimization mode. For example, the data optimization identification may include an identification for optimizing dimensions of the user behavior data. The data optimization identification may include at least one of an identification for adding a dimension of the user behavior data, an identification for merging dimensions of the user behavior data, or an identification for removing a dimension of the user behavior data. The identification for adding the dimension of the user behavior data may be used to add the dimension of the user behavior data. The identification for merging the dimensions of the user behavior data may be used to merge the dimensions of the user behavior data. The identification for removing the dimension of the user behavior data may be used to remove the dimension of the user behavior data.

According to embodiments of the present disclosure, in response to receiving the data optimization request from the client corresponding to the block chain node, or in response to receiving the data optimization request from the client through the block chain node corresponding to the client, the server may parse the data optimization request to obtain the data optimization identification, determine the data optimization mode according to the data optimization identification, and optimize the target user behavior data and the at least one candidate user behavior data corresponding to the plurality of candidate users according to the data optimization mode, so as to obtain the optimized target user behavior data and the optimized candidate user behavior data. The server may recommend the target object to the target user according to the optimized target user behavior data and the optimized at least one candidate user behavior data corresponding to the plurality of candidate users. That is, the server may determine an optimized target user behavior vector according to the optimized target user behavior data, determine optimized at least one candidate user behavior vector corresponding to the plurality of candidate users according to the optimized at least one candidate user behavior data corresponding to the plurality of candidate users, and determine the target object recommended to the target user according to the optimized target user behavior vector and the optimized at least one candidate user behavior vector corresponding to the plurality of candidate users.

For example, when registering an application loaded on a client, a user corresponding to the client may not agree to a request for object recommendation using user behavior data. After using the application for a period of time, the user is satisfied with the functions provided by the application, and intends to know more about other functions of the application. Some other functions may only be used when the user agrees to the above request, and then the user agrees to the above request. In this case, a data upload operation is triggered by the user. In response to detecting that the data upload operation is triggered, the client determines that the data optimization identification is an identification for adding a dimension of the user behavior data, that is, an identification used to add the dimension "time difference between authorization and registration" in the user behavior data. A data optimization mode is generated according to the data optimization identification, and a data optimization request is generated according to the data optimization mode. In response to receiving the data optimization request from the client, the server may optimize the target user behavior data and the at least one candidate user behavior data corresponding to the plurality of candidate users according to the data optimization mode indicated by the data optimization request. The "time difference between authorization and registration" may indicate a user preference for the application. The smaller the value of the time difference, the higher the user preference for the application.

According to embodiments of the present disclosure, by optimizing the target user behavior data and the candidate user behavior data, a data quality may be improved, and the accuracy of the object recommendation may be further improved.

Figure 5:
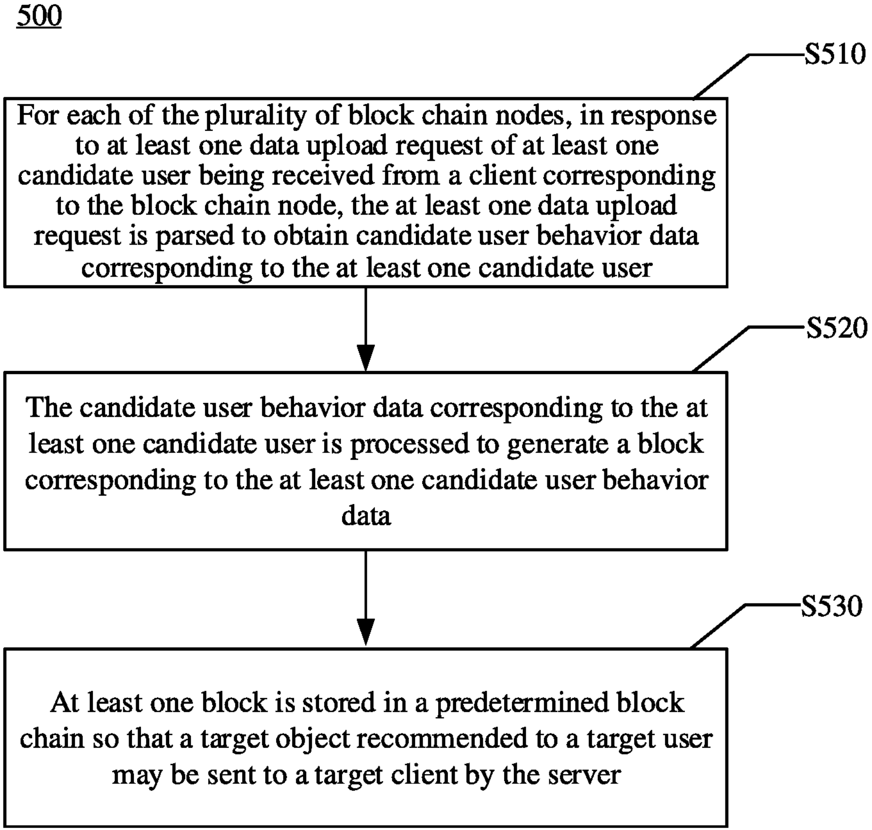
FIG. 5 schematically shows a flowchart of a method of recommending an object according to other embodiments of the present disclosure.

FIG. 5 schematically shows a flowchart of a method of recommending an object according to other embodiments of the present disclosure.

According to embodiments of the present disclosure, the method of recommending the object may be applied to a block chain network. The block chain network includes a plurality of block chain nodes. The plurality of block chain nodes includes a block chain node corresponding to at least one personal client and a block chain node corresponding to at least one service client.

As shown in FIG. 5, a method 500 includes operation S510 to operation S530.

In operation S510, for each of the plurality of block chain nodes, in response to at least one data upload request of at least one candidate user being received from a client corresponding to the block chain node, the at least one data upload request is parsed to obtain candidate user behavior data corresponding to the at least one candidate user.

In operation S520, the candidate user behavior data corresponding to the at least one candidate user is processed to generate a block corresponding to the at least one candidate user behavior data.

In operation S530, at least one block is stored in a predetermined block chain so that a target object recommended to a target user may be sent to a target client by the server. The target object is determined by the server according to a target user behavior vector and at least one candidate user behavior vector corresponding to a plurality of candidate users. The target user behavior data is user behavior data of the target user received by the server from the target client.

According to embodiments of the present disclosure, the block chain node in the block chain network may be used to store the candidate user behavior data of at least one candidate user from the client corresponding to the block chain node in a corresponding predetermined block chain.

According to embodiments of the present disclosure, the block chain node may acquire the candidate user behavior data of the at least one candidate user from the client corresponding to the block chain node. The block chain node may broadcast the candidate user behavior data of the at least one candidate user on the block chain network, so that the candidate user behavior data of the at least one candidate user is received by a first other block chain node in the block chain network. The block chain network may determine a first ledgering block chain node with ledgering rights from the block chain network by using a consensus algorithm. The first ledgering block chain node may package the respective candidate user behavior data of the at least one candidate user, and creates a block corresponding to at least one candidate user behavior data. The first ledgering block chain node broadcasts the block corresponding to the at least one candidate user behavior data for a verification by a second other block chain node in the block chain network. When it is determined that a verification result is success, the block is received by the second other block chain node and is linked at an end of the corresponding predetermined block chain. After it is determined that the block has been received by all block chain nodes, the candidate user behavior data is stored in the predetermined block chains respectively corresponding to the plurality of block chain nodes. Different block chain nodes may be used to maintain the same predetermined block chain.

According to embodiments of the present disclosure, for each block chain node, the candidate user behavior data from the client corresponding to the block chain node may be stored in the predetermined block chain in the above-mentioned manner, so that the server may acquire at least one candidate user behavior data corresponding to a plurality of candidate users from the predetermined block chain. In addition, the block chain node corresponding to the target client is also a block chain node in the block chain network, and the target user behavior data of the target user corresponding to the target client may also be stored in the predetermined block chain for the block chain node corresponding to the target client.

According to embodiments of the present disclosure, the above operations S510~S530 may be performed by using a smart contract related to the stored user behavior data.

According to embodiments of the present disclosure, operation S520 may further include the following operations.

For each of the at least one candidate user, when it is determined according to the user identification information corresponding to the candidate user that a block corresponding to the user identification information is contained in the predetermined block chain, the candidate user behavior data corresponding to the candidate user is processed to generate a block corresponding to the candidate user behavior data.

According to embodiments of the present disclosure, if it is determined that a block corresponding to the user identification information of the candidate user is contained in the predetermined block chain, the candidate user behavior data corresponding to the candidate user may be packaged to generate a block corresponding to the candidate user behavior data, and the candidate user behavior data of the candidate user before a current timestamp is no longer traced.

According to embodiments of the present disclosure, by degenerating the candidate user behavior data having the same user identification information, an amount of data processing may be reduced, and an efficiency of data processing may be improved.

According to embodiments of the present disclosure, the above-mentioned method of recommending the object may further include the following operations.

At least one block of a candidate user corresponding to a same user identification information is determined. A set of user profiles corresponding to the user identification information is generated according to the at least one block of the candidate user corresponding to the same user identification information. The set of user profiles is sent to the client corresponding to the user identification information, so that the set of user profiles is acquired by the candidate user corresponding to the user identification information.

According to embodiments of the present disclosure, the set of user profiles may indicate a change in preference for a candidate object in different time periods.

According to embodiments of the present disclosure, it is possible to determine the at least one block of the candidate user corresponding to the same user identification information. The at least one block of the candidate user corresponding to the same user identification information may be processed to obtain the candidate user behavior data of the candidate user corresponding to the same user identification information. The candidate behavior data may indicate the respective preferences of the candidate user for at least one candidate object. The set of user profiles for the candidate user corresponding to the user identification information may be generated according to the candidate user behavior data of the candidate user corresponding to the same user identification information.

According to embodiments of the present disclosure, the set of user profiles for the candidate user corresponding to the user identification information is generated according to the candidate user behavior data of the candidate user corresponding to the same user identification information, so that a change process on a user preference may be obtained by the user according to the set of user profiles.

According to embodiments of the present disclosure, the above-mentioned method of recommending the object may further include the following operations.

The set of user profile is displayed visually.

According to embodiments of the present disclosure, the visual display form may include at least one of a bar chart, a pie chart, a polygonal chart, or a heat map.

According to embodiments of the present disclosure, the set of user profiles may be displayed in a visual form, so that the change process on the user preference may be obtained by the user according to the set of user profiles.

According to embodiments of the present disclosure, the above-mentioned method of recommending the object may further include the following operations.

At least one block is stored in batch in the predetermined block chain.

According to embodiments of the present disclosure, the block chain is concatenated with time stamps, and data co-processing may be performed efficiently and quickly by batch uploading. In addition, the batch uploading operation may be achieved using a smart contract related to the stored user behavior data. As the smart contract is reproducible, by using the method of recommending the object in embodiments of the present disclosure, it is possible to efficiently expand clients participating in the object recommendation, and quickly integrate clients with different types of functions, such as a client that may support an item transaction and a client that may support a token transaction. The above-mentioned batch uploading operation is beneficial to the client that publishes it own tradable data in batches. According to embodiments of the present disclosure, the above-mentioned method of recommending the object may further include the following operations.

In response to a data upload request from a new candidate user from the client corresponding to the block chain node being received, the data upload request of the new candidate user is parsed to obtain candidate user behavior data corresponding to the new candidate user. The candidate user behavior data corresponding to the new candidate user is processed to generate a block corresponding to the candidate user behavior data of the new candidate user. The predetermined block chain is updated according to the block corresponding to the candidate user behavior data of the new candidate user.

According to embodiments of the present disclosure, the block chain node may detect whether a data upload request is received from the client, so as to update the predetermined block chain according to the data upload request, thereby achieving a management of the predetermined block chain.

According to embodiments of the present disclosure, the block chain node of the block chain network may acquire candidate user behavior data of a new candidate user from the client corresponding to the block chain node. The block chain node may broadcast the candidate user behavior data of the new candidate user on the block chain network, so that the candidate user behavior data respectively corresponding to the at least one candidate user is received by a third other block chain node in the block chain network. The block chain network may determine a second ledgering block chain node with ledgering rights from the block chain network by using a consensus algorithm. The second ledgering block chain node may package the candidate user behavior data of the new candidate user, and creates a block corresponding to the candidate user behavior data of the new candidate user. The second ledgering block chain node broadcasts the block corresponding to the candidate user behavior data of the new candidate user for a verification by a fourth other block chain node in the block chain network. When it is determined that a verification result is success, the block is received by the fourth other block chain node and is linked at an end of the corresponding predetermined block chain.

According to embodiments of the present disclosure, the above-mentioned method of recommending the object may further include the following operations.

In response to receiving a first public key from the target client, the block chain node corresponding to the target client stores the first public key in the predetermined block chain, so that the server encrypts the target object by using the first public key to obtain a first encrypted target object. The first public key is generated by processing the user identification information of the target user by the target client using a first encryption algorithm.

According to embodiments of the present disclosure, the server may send the first encrypted target object to the target client. The target client may decrypt the first encrypted target object by using a first private key to obtain the target object.

According to embodiments of the present disclosure, the above-mentioned method of recommending the object may further include the following operations.

In response to receiving a second encrypted target object from the server, the block chain node corresponding to the target client decrypts the second encrypted target object by using a second private key to obtain the target object, where the second encrypted target object is obtained by the server encrypting the target object using a second public key. The target object is encrypted by using a third public key to obtain a third encrypted target object. The third encrypted target object is sent to the target client, so that the target client decrypts the third encrypted target object by using a third private key to obtain the target object recommended to the target user.

According to embodiments of the present disclosure, the second public key and the second private key may be generated by processing the user identification information of the target user by the block chain node using a second encryption algorithm. The third public key and the third private key may be generated by processing the user identification information of the target user by the target client using a third encryption algorithm.

According to embodiments of the present disclosure, the above-mentioned method of recommending the object may further include the following operations.

In response to receiving the target user behavior data of the target user from the target client, the block chain node corresponding to the target client sends the target user behavior data to the server.

According to embodiments of the present disclosure, the above-mentioned method of recommending the object may further include the following operations.

In response to receiving recommendation feedback data of the target user from the target client, the block chain node corresponding to the target client sets a feedback dimension, so as to add the feedback dimension to the dimension of the candidate user behavior data.

According to embodiments of the present disclosure, the recommendation feedback data may indicate a response of the target user to the target object. For example, the recommendation feedback data may include at least one of: data that may indicate that the target user purchased the recommended target object, data that may indicate that the target user browsed but did not purchase the recommended target object, or data that may indicate that the target user did not browse the recommended target object.

According to embodiments of the present disclosure, the target client may send the recommendation feedback data to the block chain node corresponding to the target client in response to a detection of the recommendation feedback data from the target user. The block chain node corresponding to the target client may set the feedback dimension in response to a detection of the recommendation feedback data from the target client, and add the feedback dimension to the dimension of the candidate user behavior data.

According to embodiments of the present disclosure, by adding the feedback dimension to the user behavior data when receiving the recommendation feedback data from the target user, it is possible to improve a quality of the user behavior data, and improve an activity of the user to participate in the object recommendation.

According to embodiments of the present disclosure, the above-mentioned method of recommending the object may further include the following operations.

Data of the feedback dimension in the candidate user behavior data corresponding to the target object is determined according to the recommendation feedback data.

According to embodiments of the present disclosure, a candidate user corresponding to the target object may be determined according to the target object. The data of the feedback dimension in the candidate user behavior data of the candidate user corresponding to the target object may be determined according to the recommendation feedback data. The data of the feedback dimension may be represented by an acceptance degree.

For example, the acceptance degree may be a numerical value greater than or equal to 0 and less than or equal to 1. If it is determined according to the recommendation feedback data that the target user has purchased the recommended target object, the acceptance degree may be set to 1, that is, the data of the feedback dimension in the candidate user behavior data of the candidate user corresponding to the target object may be 1. If it is determined according to the recommendation feedback data that the target user browsed but did not purchase the recommended target object, the acceptance degree may be set to 0.5, that is, the data of the feedback dimension in the candidate user behavior data of the candidate user corresponding to the target object may be 0.5. If it is determined according to the recommendation feedback data that the target user did not browse the recommended target object, the acceptance degree may be set to 0, that is, the data of the feedback dimension in the candidate user behavior data of the candidate user corresponding to the target object may be 0.

According to embodiments of the present disclosure, the above-mentioned method of recommending the object may further include the following operations.

A reward information for the candidate user corresponding to the target object is updated according to the recommendation feedback data.

According to embodiments of the present disclosure, the reward information may include at least one of points, discount amount, or tokens.

For example, taking the reward information being tokens as an example for description, if it is determined according to the recommendation feedback data that the target user has purchased the recommended target object, 100 tokens may be added on the basis of an original reward information for the candidate user corresponding to the target object, so as to update the reward information for the candidate user corresponding to the target object. If it is determined according to the recommendation feedback data that the target user browsed but did not purchase the recommended target object, 50 tokens may be added on the basis of the original reward information for the candidate user corresponding to the target object, so as to update the reward information for the candidate user corresponding to the target object. If it is determined according to the recommendation feedback data that the target user did not browse the recommended target object, 10 tokens may be reduced on the basis of the original reward information for the candidate user corresponding to the target object, so as to update the reward information for the candidate user corresponding to the target object.

According to embodiments of the present disclosure, the tokens obtained in a token scenario may be used for a token purchase.

According to embodiments of the present disclosure, by updating the reward information for the candidate user corresponding to the target object according to the recommendation feedback data, it is possible to improve the activity of the user to participate in the object recommendation.

Figure 6:
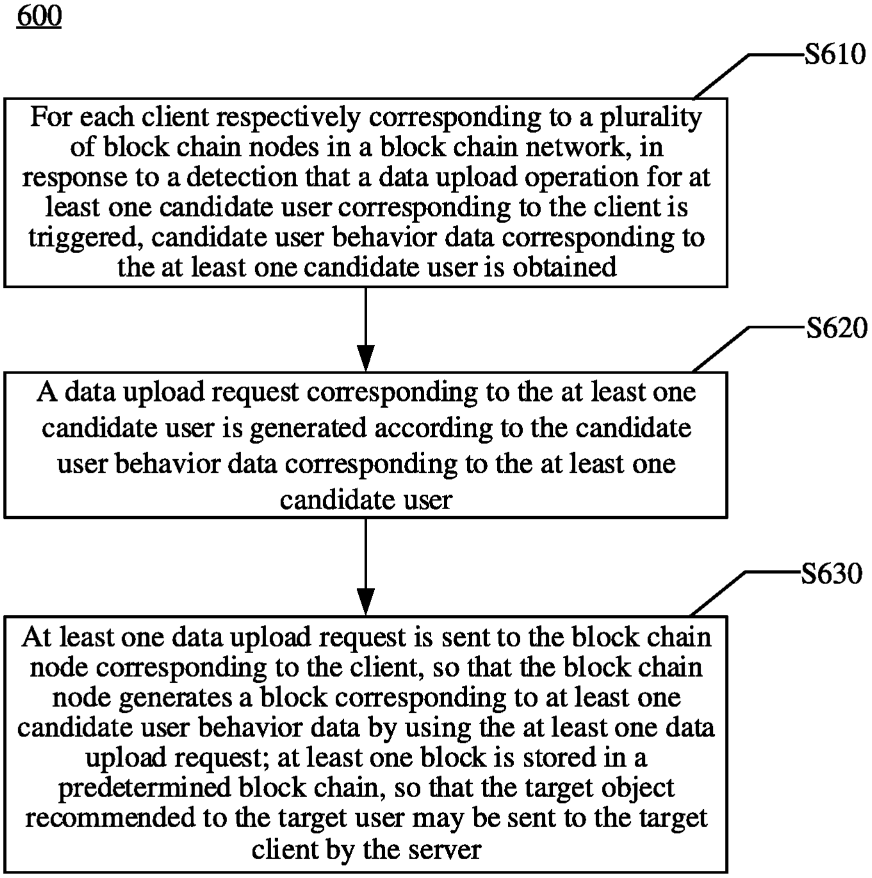
FIG. 6 schematically shows a flowchart of a method of recommending an object according to other embodiments of the present disclosure.

FIG. 6 schematically shows a flowchart of a method of recommending an object according to other embodiments of the present disclosure.

As shown in FIG. 6, a method 600 includes operation S610 to operation S630.

In operation S610, for each client respectively corresponding to a plurality of block chain nodes in a block chain network, in response to a detection that a data upload operation for at least one candidate user corresponding to the client is triggered, candidate user behavior data corresponding to the at least one candidate user is obtained.

In operation S620, a data upload request corresponding to the at least one candidate user is generated according to the candidate user behavior data corresponding to the at least one candidate user.

In operation S630, at least one data upload request is sent to the block chain node corresponding to the client, so that the block chain node generates a block corresponding to at least one candidate user behavior data by using the at least one data upload request; at least one block is stored in a predetermined block chain, so that the target object recommended to the target user may be sent to the target client by the server. The target object is determined by the server according to target user behavior data and the at least one candidate user behavior data corresponding to the plurality of candidate users. The target user behavior data is user behavior data of the target user received by the server from the target client.

According to embodiments of the present disclosure, the data upload operation may refer to an operation for triggering a storage of the user behavior data in the predetermined block chain. The data upload operation may include a click operation or a selection operation. For example, a page related to data upload may be displayed on a client, and the page contains a confirmation control. The "confirmation control" may be clicked by the candidate user so that the "confirmation control" is triggered. The client may obtain the candidate user behavior data corresponding to the candidate user in response to detecting that the confirmation control on the display page related to data upload is triggered. The candidate user behavior data may be associated with a timestamp and a client identification.

According to embodiments of the present disclosure, when the candidate user corresponding to the client registers a user account for an application program or a browser, the client may send the candidate user behavior data of the candidate user to the block chain node corresponding to the client to achieve data uploading based on a unified protocol reached between the candidate user and the service provider if the candidate user agrees to use the user behavior data for a request of object recommendation. As a result, it is possible to effectively avoid the block chain node from separately making a protocol agreement with the candidate user, simplify the uploading operation for the candidate user behavior data, and effectively protect the candidate user behavior data.

According to embodiments of the present disclosure, the above-mentioned method of recommending the object may further include the following operations.

For the target client corresponding to the target user, the user identification information of the target user is processed using the first encryption algorithm to generate the first public key and the first private key. The first public key is sent to the block chain node corresponding to the target client, so that the block chain node corresponding to the target client stores the first public key in the predetermined block chain. In response to the first encrypted target object being received from the server, the first encrypted target object is decrypted using the first private key to obtain the target object recommended to the target client. The first encrypted target object is obtained by the server encrypting the target object using the first public key.

According to embodiments of the present disclosure, the above-mentioned method of recommending the object may further include the following operations.

For the target client corresponding to the target user, the user identification information of the target user is processed using the third encryption algorithm to generate the third public key and the third private key. The third public key is sent to the block chain node corresponding to the target client, so that the block chain node corresponding to the target client encrypts the target object using the third public key to obtain the third encrypted target object. The target object is obtained by decrypting the second encrypted target object by the block chain node corresponding to the target client using the second private key, and the second encrypted target object is obtained by encrypting the target object by the server using the second public key. In response to the third encrypted target object being received from the block chain node corresponding to the target client, the third encrypted target object is decrypted using the third private key to obtain the target object recommended to the target user.

According to embodiments of the present disclosure, the above-mentioned method of recommending the object may further include the following operations.

In response to detecting that a data upload operation for a new candidate user corresponding to the client is triggered, candidate user behavior data corresponding to the new candidate user is obtained. A data upload request of the new candidate user is generated according to the candidate user behavior data corresponding to the new candidate user. The data upload request of the new candidate user is sent to the block chain node corresponding to the client, so that the block chain node corresponding to the client may update the predetermined block chain by using the candidate user behavior data of the new candidate user obtained by processing the data upload request of the new candidate user.

According to embodiments of the present disclosure, the client may detect whether a data upload request operation is triggered, so that the block chain corresponding to the client may update the predetermined block chain by using the data upload request generated based on the data request operation, thereby achieving the management of the predetermined block chain.

According to embodiments of the present disclosure, the above-mentioned method of recommending the object may further include the following operations.

A data optimization mode is determined in response to a detection that the data upload operation is triggered. A data optimization request is generated according to the data optimization mode. The data optimization request is sent to the server, so that the server optimizes the target user behavior data and the at least one candidate user behavior data corresponding to the plurality of candidate users according to the data optimization mode indicated by the data optimization request.

According to embodiments of the present disclosure, the data optimization request may include a data optimization identification. The data optimization identification may indicate the data optimization mode. For example, the data optimization identification may include an identification to optimize the dimension of the user behavior data. The data optimization identification may include at least one an identification for adding a dimension of the user behavior data, an identification for merging dimensions of the user behavior data, or an identification for removing a dimension of the user behavior data.

According to embodiments of the present disclosure, the client may detect whether the data upload request operation is triggered. If it is detected that the data upload request is triggered, a data optimization mode may be determined according to a triggering time, a data optimization identification is generated according to the data optimization mode, and a data optimization request is generated according to the data optimization identification. For example, if it is determined that a time difference between the triggering time and the registration time is greater than or equal to a time difference threshold, it may be determined that the data optimization mode is to add a dimension of the user behavior data. If it is determined that the triggering time is within a predetermined time period, it may be determined that the data optimization mode is to add a dimension of the user behavior data.

According to the embodiments of the present disclosure, the client may send the data optimization request directly to the server, or send the data optimization request to the server through the block chain node corresponding to the client, so that the server may receive the data optimization request. The server may parse the data optimization request to obtain the data optimization identification, determine the data optimization mode according to the data optimization identification, optimize the target user behavior data and the at least one candidate user behavior data corresponding to the plurality of candidate users according to the data optimization mode, so as to obtain optimized target user behavior data and optimized at least one candidate user behavior data corresponding to the plurality of candidate users. The server may recommend the target object to the target user according to the optimized target user behavior data and the optimized at least one candidate user behavior data corresponding to the plurality of candidate users.

According to embodiments of the present disclosure, the above-mentioned method of recommending the object may further include the following operations.

In response to receiving the recommendation feedback data from the target user, the target client corresponding to the target user sends recommendation feedback data to the block chain node corresponding to the target client, so that the block chain node corresponding to the target client sets the feedback dimension according to the recommended feedback data of the target user, so as to add the feedback dimension to the dimension of the candidate user behavior data.

The method of recommending the object according to embodiments of the present disclosure will be further described with reference to FIG. 7 in conjunction with specific embodiments.

Figure 7:
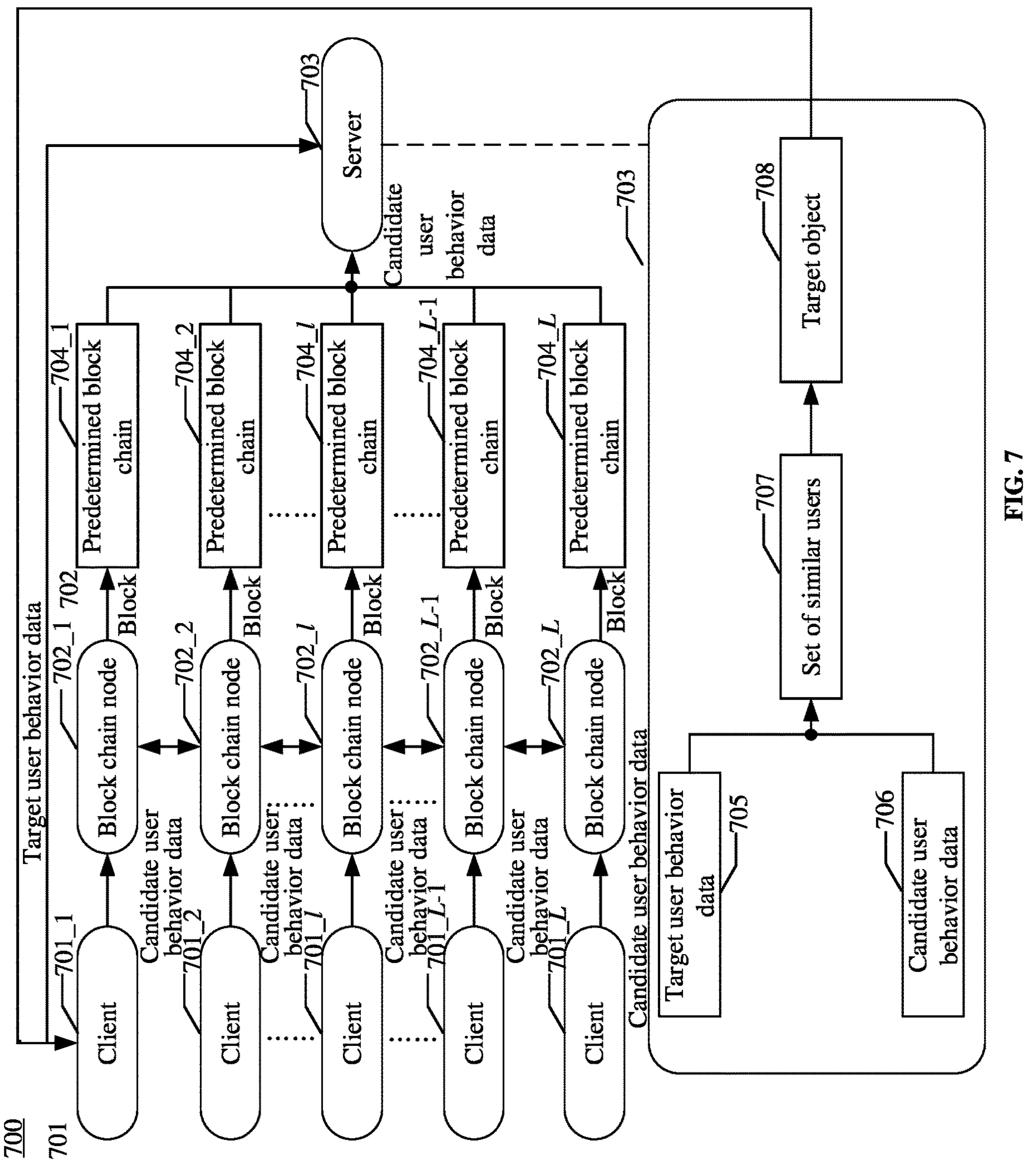
FIG. 7 schematically shows an example schematic diagram of a process of recommending an object according to embodiments of the present disclosure.

FIG. 7 schematically shows an example schematic diagram of a process of recommending an object according to embodiments of the present disclosure.

As shown in FIG. 7, a client network 701, a block chain network 702 and a server 703 are included in 700. The client network 701 may include L clients, including client 701_1, client 701_2, . . . , client 701_l, . . . , client 701_L-1, and client 701_L. The block chain network 702 may include L block chain nodes, including block chain node 702_1, block chain node 702_2, . . . , block chain node 702_l, . . . block chain node 702_L-1, and block chain node 702_L. The block chain node corresponding to the client 701_1 is the block chain node 702_1. The predetermined block chain corresponding to the block chain node 702_1 is block 7041, the predetermined block chain corresponding to the block chain node 702_2 is block 704_2, the predetermined block chain corresponding to the block chain node 702_1 is block 704_, the predetermined block chain corresponding to the block chain node 702_L-1 is block 704_L-1, and the predetermined block chain corresponding to the block chain node 702_L is block 704_L. l∈{1, 2, . . . , L−1, L}. L is an integer greater than 1. The target client is client 701_1.

In response to detecting that a data upload operation for at least one candidate user corresponding to the client 701_l is triggered, the client 701_l may obtain candidate user behavior data corresponding to the at least one candidate user, generate a data upload request corresponding to the at least one candidate user according to the candidate user behavior data corresponding to the at least one candidate user, and send the at least one data upload request to the block chain node 702_l corresponding to the client 701_1.

In response to receiving the data upload request of the at least one candidate user from the client 701_l corresponding to the block chain node, the block chain node 702_l may parse the at least one data upload request to obtain the candidate user behavior data corresponding to the at least one candidate user, process the candidate user behavior data corresponding to the at least one candidate user to generate a block corresponding to the at least one candidate user behavior data, and store the at least one block in the predetermined block chain 704_l.

In response to receiving target user behavior data 705 of the target user from the target client 701_1, the server 703 may process the target user behavior data 705 to obtain a target user behavior vector, determine a set of similar users 707 from the plurality of candidate users according to the target user behavior vector and at least one candidate user behavior vector corresponding to the plurality of candidate users, and determine, according to a set of similar user behavior data corresponding to the set of similar users 707, a target object 708 from at least one candidate object corresponding to the set of similar user behavior data. Each candidate user behavior vector may be obtained by processing candidate user behavior data 706 corresponding to the candidate user behavior vector by the server 703. The server 703 sends a target object 708 to the target client 701_1, so as to recommend the target object 708 to the target user.

According to embodiments of the present disclosure, the recommendation of the target object for the target user may be achieved based on the tradable data of the user's historical behavior habits, which is beneficial for the user to select corresponding user behavior data for object recommendation in different fields, such as field of finance and field of healthcare.

Taking the token scenario in the field of finance as an example, the plurality of candidate objects corresponding to the candidate user behavior data may include at least one token and at least one token transaction platform. The token transaction platform may refer to a client that supports a token transaction. The server 703 may determine the target object from the plurality of candidate objects according to the target user behavior data 705 of the target user and at least one candidate user behavior data corresponding to the plurality of candidate users. The candidate user behavior data may include candidate tradable data. For example, the target object may include at least one a target token or a target token transaction platform.

By using the solutions of embodiments of the present disclosure, it is possible to obtain a valuable investment advice, for example, obtain a target token that is currently worth investing in and has a high yield, or obtain a target token transaction platform that currently matches the user's transaction habits best and may increase user's income.

Taking a physician recommendation in the field of healthcare as an example, the plurality of candidate objects corresponding to the candidate user behavior data may include an object related to an illness experience of the user, an object related to a surgery experience of the user, an object related to a healing experience of the user, and an object related to a physician. The physician is related to the user. The server 703 may determine a target object from the plurality of candidate objects according to the target user behavior data 705 of the target user and at least one candidate user behavior data corresponding to the plurality of candidate users. The target object may include a target physician.

By using the solutions of embodiments of the present disclosure, it is possible to obtain a valuable medical information, which is also of great value for social welfare.

Figure 8:
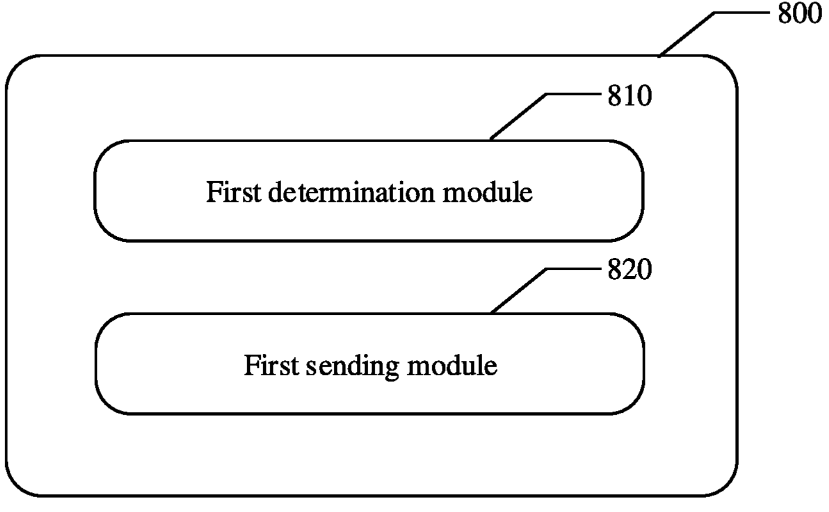
FIG. 8 schematically shows a block diagram of an apparatus of recommending an object according to other embodiments of the present disclosure.

FIG. 8 schematically shows a block diagram of an apparatus of recommending an object according to other embodiments of the present disclosure.

As shown in FIG. 8, an apparatus 800 of recommending an object may include a first determination module 810 and a first sending module 820.

The first determination module 810 is used to determine, in response to receiving target user behavior data of a target user from a target client, a target object according to the target user behavior data and at least one candidate user behavior data corresponding to a plurality of candidate users.

The first sending module 820 is used to send the target object to the target client, so as to recommend the target object to the target user.

According to embodiments of the present disclosure, each of the candidate user behavior data is stored in a predetermined block chain, each of the candidate user behavior data corresponds to at least one of a plurality of block chain nodes contained in a block chain network, and each of the candidate user behavior data indicates a preference of a candidate user for at least one candidate object.

According to embodiments of the present disclosure, the target user behavior data includes target tradable data stored in the predetermined block chain, and a block chain node corresponding to the target client stores the target tradable data in response to receiving a data upload request of the target user from the target client.

According to embodiments of the present disclosure, the target tradable data includes a plurality of tradable levels.

According to embodiments of the present disclosure, the first determination module 810 may include a first obtaining sub-module and a first determination sub-module.

The first obtaining sub-module is used to process the target user behavior data to obtain a target user behavior vector, in response to receiving the target user behavior data of the target user from the target client.

The first determination sub-module is used to determine the target object according to the target user behavior vector and at least one candidate user behavior vector respectively corresponding to the plurality of candidate users. Each of the at least one candidate user behavior vector is obtained by processing the candidate user behavior data corresponding to the candidate user behavior vector.

According to embodiments of the present disclosure, each of the at least one candidate user behavior vector being obtained by processing the candidate user behavior data corresponding to the candidate user behavior vector may include: each of the at least one candidate user behavior vector is obtained by processing the candidate user behavior data corresponding to the candidate user behavior vector by a model-based recommendation algorithm.

According to embodiments of the present disclosure, each of the at least one candidate user behavior vector being obtained by processing the candidate user behavior data corresponding to the candidate user behavior vector by a model-based recommendation algorithm may include: each of the at least one candidate user behavior vector is determined according to a user latent factor matrix and an object latent factor matrix that are obtained when a predetermined condition is met. The user latent factor matrix and the object latent factor matrix that are obtained when the predetermined condition is met are obtained by adjusting an element value of an initial user latent factor matrix and an element value of an initial object latent factor matrix according to an output value. The output value is determined by using the initial user latent factor matrix, the initial object latent factor matrix and a real user behavior vector based on a predetermined objective function. The real user behavior vector is determined according to the candidate user behavior data.

According to embodiments of the present disclosure, the first determination module 810 may include a second determination sub-module and a third determination sub-module.

The second determination sub-module is used to determine a set of similar users from the plurality of candidate users according to the target user behavior data and the at least one candidate user behavior data corresponding to the plurality of candidate users.

The third determination sub-module is used to determine, according to a set of similar user behavior data, the target object from at least one candidate object corresponding to the set of similar user behavior data. The set of similar user behavior data includes at least one candidate user behavior data corresponding to the set of similar users.

According to embodiments of the present disclosure, the second determination sub-module may include a first obtaining unit and a first determination unit.

The first obtaining unit is used to determine a similarity between the target user behavior data and each of the at least one candidate user behavior data corresponding to the plurality of candidate users, so as to obtain a plurality of similarities.

The first determination unit is used to determine the set of similar users from the plurality of candidate users according to the plurality of similarities.

According to embodiments of the present disclosure, the first determination unit may include a first obtaining sub-unit and a first determination sub-unit.

The first obtaining sub-unit is used to sort the plurality of candidate users according to the plurality of similarities, so as to obtain a sorting result.

The first determination sub-unit is used to determine, according to the sorting result, a predetermined number of candidate users from the plurality of candidate users as the set of similar users.

According to embodiments of the present disclosure, the first determination unit may include a second determination sub-unit.

The second determination sub-unit is used to determine the set of similar users from the plurality of candidate users according to a predetermined similarity threshold and the plurality of similarities.

According to embodiments of the present disclosure, the apparatus 800 of recommending the object may further include a first optimization module.

The first optimization module is used to optimize, in response to receiving a data optimization request, the target user behavior data and the at least one candidate user behavior data corresponding to the plurality of candidate users according to a data optimization mode indicated by the data optimization request, so as to determine the target object recommended to the target user according to optimized target behavior data and optimized candidate user behavior data.

According to embodiments of the present disclosure, the first sending module 820 may include a first sending sub-module or a second sending sub-module.

The first sending sub-module is used to send the target object directly to the target client so as to recommend the target object to the target user.

The second sending sub-module is used to send the target object to the target client through the block chain node corresponding to the target client so as to recommend the target object to the target user.

According to embodiments of the present disclosure, the apparatus 800 of recommending the object may further include a third obtaining module.

The third obtaining module is used to encrypt the target object by using a first public key to obtain a first encrypted target object.

According to embodiments of the present disclosure, the first sending sub-module may include a first sending unit.

The first sending unit is used to send the first encrypted target object directly to the target client, so that the target client decrypts the first encrypted target object using a first private key to obtain the target object recommended to the target user. The first public key and the first private key are generated by processing a user identification information of the target user by the target client using a first encryption algorithm. The first public key is stored in the predetermined block chain by using the block chain node corresponding to the target client.

According to embodiments of the present disclosure, the apparatus 800 of recommending the object may further include a fourth obtaining module.

The fourth obtaining module is used to encrypt the target object using a second public key to obtain a second encrypted target object.

According to embodiments of the present disclosure, the second sending sub-module may include a first sending unit.

The second sending unit is used to send the second encrypted target object to the target client through the block chain node corresponding to the target client, so that the target client decrypts a third encrypted target object using a third private key to obtain the target object recommended by the target user. The third encrypted target object is obtained by encrypting, by the block chain node corresponding to the target client using a third public key, the target object obtained by decrypting the second encrypted target object using a second private key. The second public key and the second private key are generated by processing the user identification information of the target user by the block chain node corresponding to the target client using a second encryption algorithm. The third public key and the third private key are generated by processing the user identification information of the target user by the target client using a third encryption algorithm.

According to embodiments of the present disclosure, the first determination module 810 may include a fourth determination sub-module or a fifth determination sub-module.

The fourth determination sub-module is used to determine the target object according to the target user behavior data and the at least one candidate user behavior data corresponding to the plurality of candidate users in response to directly receiving the target user behavior data of the target user from the target client.

The fifth determination sub-module is used to determine the target object according to the target user behavior data and the at least one candidate user behavior data corresponding to the plurality of candidate users in response to receiving the target user behavior data of the target user from the target client through the block chain node corresponding to the target client.

According to embodiments of the present disclosure, the at least one candidate object corresponding to the candidate user behavior data includes at least one selected from: a client attribute information of a client corresponding to the candidate user behavior data, a client function information of the client corresponding to the candidate user behavior data, a client credit information of the client corresponding to the candidate user behavior data, or an item attribute information of an item corresponding to the candidate user behavior data.

According to embodiments of the present disclosure, the plurality of block chain nodes include a block chain node supporting a token transaction.

According to embodiments of the present disclosure, the target object includes a plurality of candidate objects.

According to embodiments of the present disclosure, the apparatus 800 of recommending the object may further include a third generation module and a third sending module.

The third generation module is used to generate an object recommendation graph according to a plurality of target objects respectively corresponding to a plurality of time periods.

The third sending module is used to send the object recommendation graph to the target client, so as to recommend the object recommendation graph to the target user.

According to embodiments of the present disclosure, there may be a plurality of target users.

According to embodiments of the present disclosure, the first determination module 810 may include a sixth determination sub-module.

The sixth determination sub-module is used to perform, in response to receiving a plurality of target user behavior data of the plurality of target users from at least one target client, a batch processing on the plurality of target user behavior data and the at least one candidate user behavior data corresponding to the plurality of candidate users, so as to determine a plurality of target objects respectively corresponding to the plurality of target users.

According to embodiments of the present disclosure, the first sending module 820 may include a third sending sub-module.

The third sending sub-module is used to send the target objects respectively corresponding to the plurality of target users to the at least one target client, so as to recommend the target objects respectively to the plurality of target users.

According to embodiments of the present disclosure, one of the target user and the candidate user includes a non-registered user.

Figure 9:
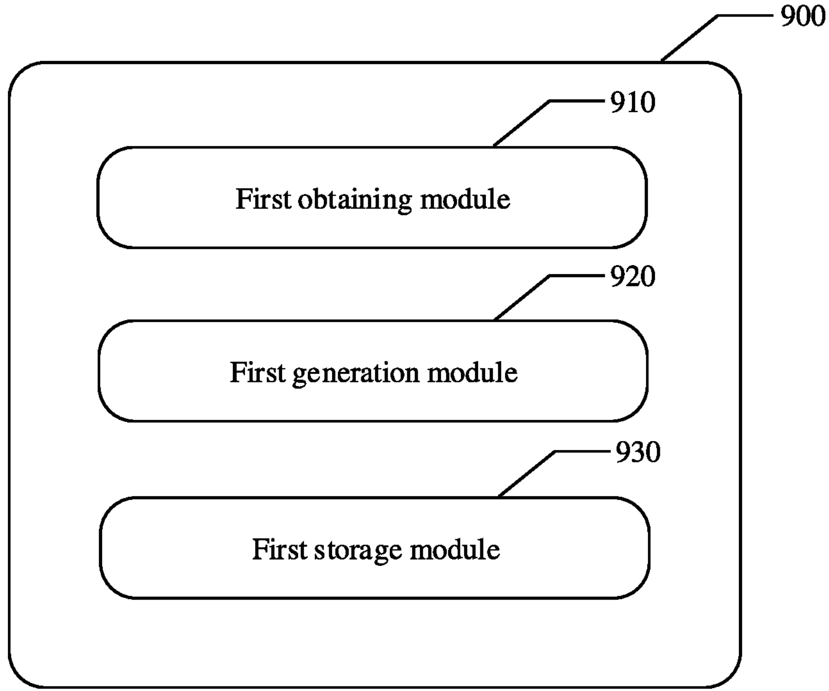
FIG. 9 schematically shows a block diagram of an apparatus of recommending an object according to other embodiments of the present disclosure.

FIG. 9 schematically shows a block diagram of an apparatus of recommending an object according to other embodiments of the present disclosure.

According to embodiments of the present disclosure, the apparatus of recommending the object may be provided in a block chain network. The block chain network may include a plurality of block chain nodes. The plurality of block chain nodes may include a block chain node corresponding to at least one personal client and a block chain node corresponding to at least one service client.

As shown in FIG. 9, an apparatus 900 of recommending an object may include a first obtaining module 910, a first generation module 920, and a first storage module 930.

The first obtaining module 910 is used to parse, for each of the plurality of block chain nodes, in response to receiving at least one data upload request of at least one candidate user from a client corresponding to the block chain node, the at least one data upload request to obtain candidate user behavior data corresponding to the at least one candidate user.

The first generation module 920 is used to process the candidate user behavior data corresponding to the at least one candidate user to generate a block corresponding to at least one candidate user behavior data.

The first storage module 930 is used to store at least one block in a predetermined block chain, so that a target object recommended to a target user is sent to a target client by a server. The target object is determined by the server according to target user behavior data and at least one candidate user behavior data corresponding to a plurality of candidate users, and the target user behavior data is user behavior data of the target user received by the server from the target client.

According to embodiments of the present disclosure, the apparatus 900 of recommending the object may further include a fifth obtaining module, a fourth generation module, and a first update module.

The fifth obtaining module is used to parse, in response to receiving a data upload request of a new candidate user from a client corresponding to the block chain node, the data upload request of the new candidate user to obtain candidate user behavior data corresponding to the new candidate user.

The fourth generation module is used to process the candidate user behavior data corresponding to the new candidate user to generate a block corresponding to the candidate user behavior data of the new candidate user.

The first update module is used to update the predetermined block chain according to the block corresponding to the candidate user behavior data of the new candidate user.

According to embodiments of the present disclosure, the apparatus 900 of recommending the object may further include a second storage module.

The second storage module is used to store, in response to receiving a first public key from the target client, the first public key in the predetermined block chain by using the block chain node corresponding to the target client, so that the server encrypts the target object using the first public key to obtain a first encrypted target object. The first public key is generated by processing a user identification information of the target user by the target client using a first encryption algorithm.

According to embodiments of the present disclosure, the apparatus 900 of recommending the object may further include a sixth obtaining module, a seventh obtaining module, and a fourth sending module.

The sixth obtaining module is used to decrypt, in response to receiving a second encrypted target object from the server, the second encrypted target object by the block chain node corresponding to the target client using a second private key, so as to obtain the target object. The second encrypted target object is obtained by encrypting the target object by the server using a second public key.

The seventh obtaining module is used to encrypt the target object using a third public key to obtain a third encrypted target object.

The fourth sending module is used to send the third encrypted target object to the target client, so that the target client decrypts the third encrypted target object using a third private key to obtain the target object recommended to the target user. The second public key and the second private key are generated by processing a user identification information of the target user by the block chain node using a second encryption algorithm. The third public key and the third private key are generated by processing the user identification information of the target user by the target client using a third encryption algorithm.

According to embodiments of the present disclosure, the apparatus 900 of recommending the object may further include a fifth sending module.

The fifth sending module is used to send, in response to receiving target user behavior data of the target user from the target client, the target user behavior data to the server by using the block chain node corresponding to the target client.

According to embodiments of the present disclosure, the apparatus 900 of recommending the object may further include a setting module.

The setting module is used to set a feedback dimension by using the block chain node corresponding to the target client in response to receiving recommendation feedback data of the target user from the target client, so as to add the feedback dimension to a dimension of the candidate user behavior data.

According to embodiments of the present disclosure, the apparatus 900 of recommending the object may further include a second determination module.

The second determination module is used to determine, according to the recommendation feedback data, data of the feedback dimension in the candidate user behavior data of the candidate user corresponding to the target object.

According to embodiments of the present disclosure, the apparatus 900 of recommending the object may further include a second update module.

The second update module is used to update, according to the recommendation feedback data, a reward information for the candidate user corresponding to the target object.

According to embodiments of the present disclosure, the first generation module 920 may include a generation sub-module.

The generation sub-module is used to process, for each of the at least one candidate user, the candidate user behavior data corresponding to the candidate user to generate a block corresponding to the candidate user behavior data, in response to determining that a block corresponding to the user identification information is contained in the predetermined block chain according to the user identification information corresponding to the candidate user.

According to embodiments of the present disclosure, the apparatus 900 of recommending the object may further include a third determination module, a fourth determination module, and a sixth sending module.

The third determination module is used to determine at least one block of a candidate user corresponding to a same user identification information.

The fourth determination module is used to generate a set of user profiles corresponding to the user identification information according to the at least one block of the candidate user corresponding to the same user identification information.

The sixth sending module is used to send the set of user profiles to a client corresponding to the user identification information, so that the set of user profiles is acquired by the candidate user corresponding to the user identification information.

According to embodiments of the present disclosure, the apparatus 900 of recommending the object may further include a display module.

The display module is used to display the set of user profiles visually.

According to embodiments of the present disclosure, the first storage module 930 may include a storage sub-module.

The storage sub-module is used to store the at least one block in batch in the predetermined block chain.

Figure 10:
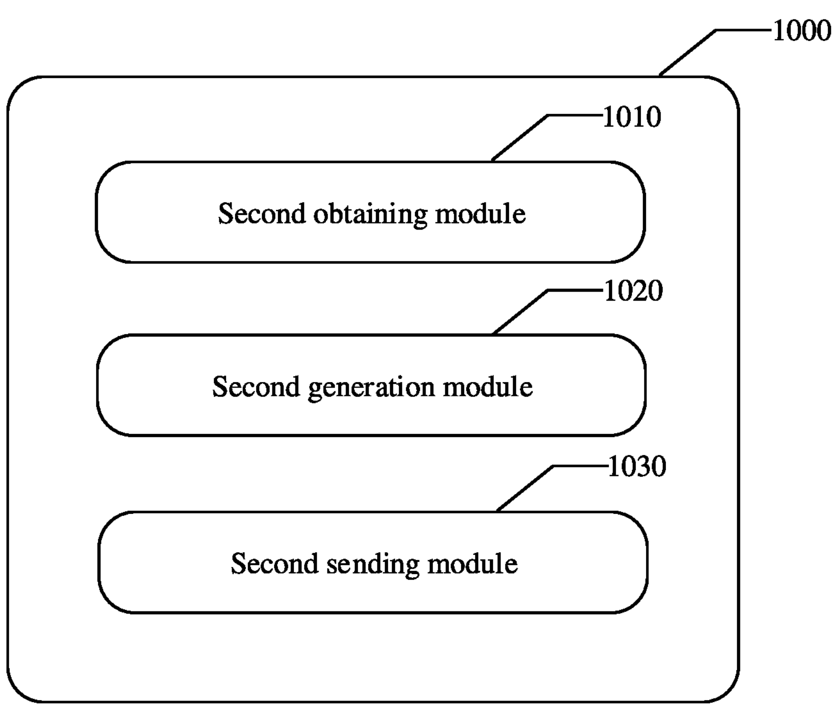
FIG. 10 schematically shows a block diagram of an apparatus of recommending an object according to other embodiments of the present disclosure.

FIG. 10 schematically shows a block diagram of an apparatus of recommending an object according to other embodiments of the present disclosure.

As shown in FIG. 10, an apparatus 1000 of recommending an object may include a second obtaining module 1010, a second generation module 1020, and a second sending module 1030.

The second obtaining module 1010 is used to obtain, for each client respectively corresponding to a plurality of block chain nodes in a block chain network, in response to a detection that a data upload operation for at least one candidate user corresponding to the client is triggered, candidate user behavior data corresponding to the at least one candidate user.

The second generation module 1020 is used to generate a data upload request corresponding to the at least one candidate user according to the candidate user behavior data corresponding to the at least one candidate user.

The second sending module 1030 is used to send at least one data upload request to the block chain node corresponding to the client so that the block chain node generates a block corresponding to at least one candidate user behavior data by using the at least one data upload request, and storing at least one block in a predetermined block chain so that a target object recommended to a target user is sent to a target client by a server. The target object is determined by the server according to target user behavior data and at least one candidate user behavior data corresponding to a plurality of candidate users, and the target user behavior data is user behavior data of the target user received by the server from the target client.

According to embodiments of the present disclosure, the apparatus 1000 of recommending the object may further include a fifth generation module, a seventh sending module, and an eighth obtaining module.

The fifth generation module is used to process, for the target client corresponding to the target user, a user identification information of the target user by using a first encryption algorithm so as to generate a first public key and a first private key.

The seventh sending module is used to send the first public key to a block chain node corresponding to the target client, so that the block chain node corresponding to the target client stores the first public key in the predetermined block chain.

The eighth obtaining module is used to decrypt, in response to receiving a first encrypted target object from the server, the first encrypted target object using the first private key to obtain a target object recommended to the target client. The first encrypted target object is obtained by encrypting the target object by the server using the first public key.

According to embodiments of the present disclosure, the apparatus 1000 of recommending the object may further include a sixth generation module, an eighth sending module, and a ninth obtaining module.

The sixth generation module is used to process, for the target client corresponding to the target user, a user identification information of the target user using a third encryption algorithm to generate a third public key and a third private key.

The eighth sending module is used to send the third public key to a block chain node corresponding to the target client, so that the block chain node corresponding to the target client encrypts the target object using the third public key to obtain a third encrypted target object. The target object is obtained by decrypting a second encrypted target object by the block chain node corresponding to the target client using a second private key, and the second encrypted target object is obtained by encrypting the target object by the server using a second public key.

The ninth obtaining module is used to decrypt, in response to receiving the third encrypted target object from the block chain node corresponding to the target client, the third encrypted target object using the third private key to obtain the target object recommended to the target user.

According to embodiments of the present disclosure, the apparatus 1000 of recommending the object may further include a tenth obtaining module, a seventh generation module, and a ninth sending module.

The tenth obtaining module is used to obtain, in response to a detection that a data upload operation for a new candidate user corresponding to the client is triggered, candidate user behavior data corresponding to the new candidate user.

The seventh generation module is used to generate a data upload request of the new candidate user according to the candidate user behavior data corresponding to the new candidate user.

The ninth sending module is used to send the data upload request of the new candidate user to the block chain node corresponding to the client, so that the block chain node corresponding to the client updates the predetermined block chain by using the candidate user behavior data of the new candidate user obtained by processing the data upload request of the new candidate user.

According to embodiments of the present disclosure, the apparatus 1000 of recommending the object may further include a fifth determination module, an eighth generation module, and a tenth sending module.

The fifth determination module is used to determine a data optimization mode in response to a detection that the data upload operation is triggered.

The eighth generation module is used to generate a data optimization request according to the data optimization mode.

The tenth sending module is used to send the data optimization request to the server, so that the server optimizes the target user behavior data and at least one candidate user behavior data corresponding to the plurality of candidate users according to the data optimization mode indicated by the data optimization request.

According to embodiments of the present disclosure, the apparatus 1000 of recommending the object may further include an eleventh sending module.

The eleventh sending module is used to send, in response to receiving recommendation feedback data from the target user, the recommendation feedback data to the block chain node corresponding to the target client by using the target client corresponding to the target user, so that the block chain node corresponding to the target client sets a feedback dimension according to the recommendation feedback data of the target user, so as to add the feedback dimension to a dimension of the candidate user behavior data.

Any number of the modules, sub-modules, units and sub-units according to embodiments of the present disclosure, or at least part of functions of any number of them may be implemented in one module. Any one or more of the modules, sub-modules, units and sub-units according to embodiments of the present disclosure may be split into a plurality of modules for implementation. Any one or more of the modules, sub-modules, units and sub-units according to embodiments of the present disclosure may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by hardware or firmware in any other reasonable manner of integrating or encapsulating the circuit, or may be implemented by any one of three implementation modes of software, hardware and firmware or an appropriate combination thereof. Alternatively, one or more of the modules, sub-modules, units and sub-units according to embodiments of the present disclosure may be at least partially implemented as a computer program module that, when executed, performs the corresponding functions.

For example, any number of the first determination module 810 and the first sending module 820, the first obtaining module 910, the first generation module 920 and the first storage module 930, and the second obtaining module 1010, the second generation module 1020 and the second sending module 1030 may be combined into one module/unit/sub-unit for implementation, or any one of the modules/units/sub-units may be divided into a plurality of modules/units/sub-units. Alternatively, at least part of the functions of one or more of these modules/units/sub-units may be combined with at least part of the functions of other modules/units/sub-units and implemented in one module/unit/sub-unit. According to embodiments of the present disclosure, at least one of the first determination module 810 and the first sending module 820, the first obtaining module 910, the first generation module 920 and the first storage module 930, and the second obtaining module 1010, the second generation module 1020 and the second sending module 1030 may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable manner of integrating or encapsulating the circuit, or may be implemented by any one of the three implementation modes of software, hardware and firmware or an appropriate combination thereof. Alternatively, at least one of the first determination module 810 and the first sending module 820, the first obtaining module 910, the first generation module 920 and the first storage module 930, and the second obtaining module 1010, the second generation module 1020 and the second sending module 1030 may be at least partially implemented as a computer program module that may perform corresponding functions when executed.

It should be noted that a part for the apparatus of recommending the object in embodiments of the present disclosure corresponds to a part for the method of recommending the object in embodiments of the present disclosure. For the descriptions of the apparatus of recommending the object, reference may be made to the method of recommending the object, and details will not be repeated here.

Embodiments of the present disclosure further provide a system of recommending an object.

According to embodiments of the present disclosure, the system of recommending the object may include clients respectively corresponding to a plurality of block chain nodes in a block chain network, the block chain network, and a server.

The clients respectively corresponding to the plurality of block chain nodes in the block chain network are used to: in response to detecting that a data upload operation for at least one candidate user corresponding to the client is triggered, obtain candidate user behavior data corresponding to the at least one candidate user, where each candidate user behavior data indicates a preference of a candidate user for at least one candidate object; generate a data upload request corresponding to the at least one candidate user according to the candidate user behavior data corresponding to the at least one candidate user; and send at least one data upload request to the block chain node corresponding to the client.

Each of the plurality of block chain nodes is used to: in response to receiving the data upload request of at least one candidate user from the client corresponding to the block chain node, parse the at least one data upload request to obtain the candidate user behavior data corresponding to the at least one candidate user; process the candidate user behavior data corresponding to the at least one candidate user to generate a block corresponding to at least one candidate user behavior data; and store at least one block in a predetermined block chain.

The server is used to: in response to receiving target user behavior data of a target user from a target client, determine a target object according to the target user behavior data and at least one candidate user behavior data corresponding to a plurality of candidate users; and send the target object to the target client so as to recommend the target object to the target user.

According to embodiments of the present disclosure, the client, the block chain nodes and the server included in the system of recommending the object may be used to implement the method of recommending the object described in embodiments of the present disclosure, and reference may be made to the descriptions of the corresponding parts above, which will not repeated here.

Figure 11:
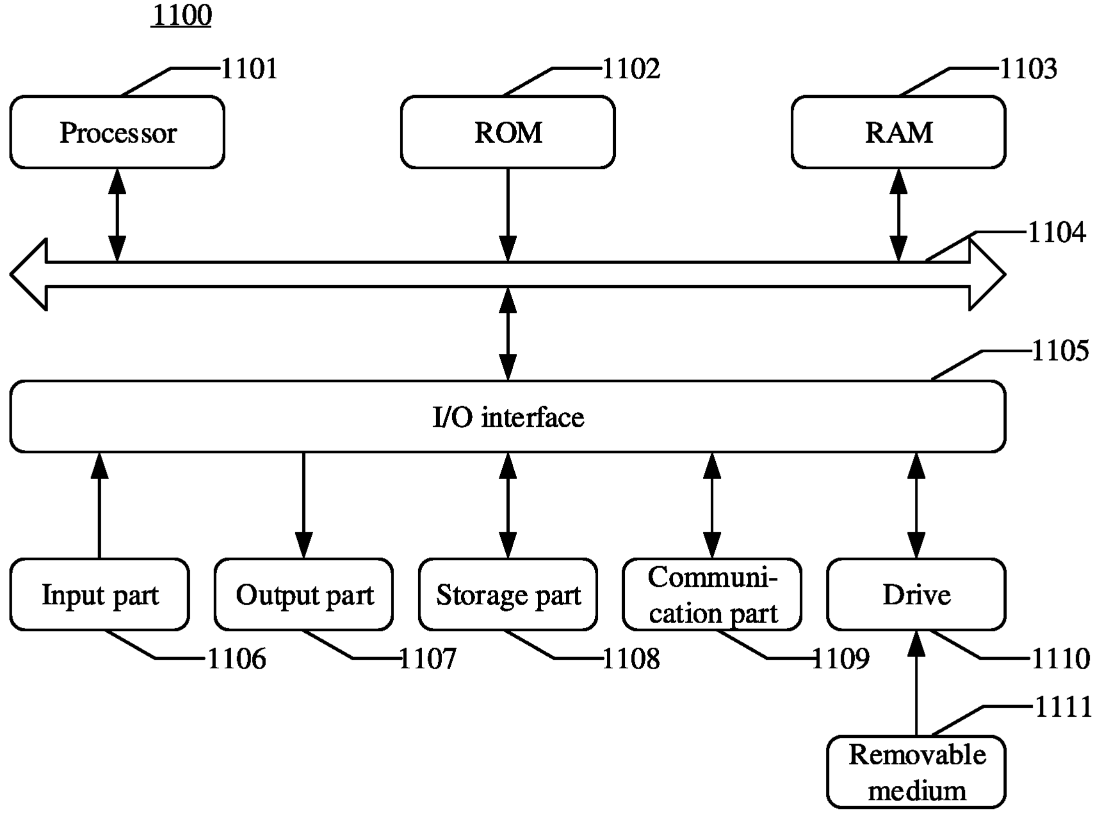
FIG. 11 schematically shows a block diagram of an electronic device suitable for implementing a method of recommending an object according to embodiments of the present disclosure.

FIG. 11 schematically shows a block diagram of an electronic device suitable for implementing the method of recommending the object according to embodiments of the present disclosure. The electronic device shown in FIG. 11 is just an example, and should not bring any limitation to functions and scopes of use of embodiments of the present disclosure.

As shown in FIG. 11, an electronic device 1100 according to embodiments of the present disclosure includes a processor 1101, which may execute various appropriate actions and processing according to the program stored in a read only memory (ROM) 1102 or the program loaded into a random access memory (RAM) 1103 from a storage part 1108. The processor 1101 may, for example, include a general-purpose microprocessor (for example, CPU), an instruction set processor and/or a related chipset and/or a special-purpose microprocessor (for example, an application specific integrated circuit (ASIC)), and the like. The processor 1101 may further include an on-board memory for caching purposes. The processor 1101 may include a single processing unit or multiple processing units for executing different actions of the method flow according to embodiments of the present disclosure.

Various programs and data required for the operation of the electronic device 1100 are stored in the RAM 1103. The processor 1101, the ROM 1102 and the RAM 1103 are connected to each other through a bus 1104. The processor 1101 executes various operations of the method flow according to embodiments of the present disclosure by executing the programs in the ROM 1102 and/or the RAM 1103. It should be noted that the program may also be stored in one or more memories other than the ROM 1102 and the RAM 1103. The processor 1101 may also execute various operations of the method flow according to embodiments of the present disclosure by executing the programs stored in the one or more memories.

According to embodiments of the present disclosure, the electronic device 1100 may further include an input/output (I/O) interface 1105 which is also connected to the bus 1104. The electronic device 1100 may further include one or more of the following components connected to the I/O interface 1105: an input part 1106 including a keyboard, a mouse, etc.; an output part 1107 including a cathode ray tube (CRT), a liquid crystal display (LCD), etc. and a speaker, etc.; a storage part 1108 including a hard disk, etc.; and a communication part 1109 including a network interface card such as a LAN card, a modem, and the like. The communication part 1109 performs communication processing via a network such as the Internet. A drive 1110 is also connected to the I/O interface 1105 as required. A removable medium 1111, such as a magnetic disk, an optical disk, a magneto-optical disk, a semiconductor memory, and the like, is installed on the drive 1110 as required, so that the computer program read therefrom is installed into the storage part 1108 as needed.

The method flow according to embodiments of the present disclosure may be implemented as a computer software program. For example, embodiments of the present disclosure include a computer program product including a computer program carried on a computer-readable storage medium. The computer program includes a program code for execution of the method shown in the flowchart. In such embodiments, the computer program may be downloaded and installed from the network through the communication part 1109, and/or installed from the removable medium 1111. When the computer program is executed by the processor 1101, the above-mentioned functions defined in the system of embodiments of the present disclosure are performed. According to embodiments of the present disclosure, the above-described systems, apparatuses, devices, modules, units, etc. may be implemented by computer program modules.

The present disclosure further provides a computer-readable storage medium, which may be included in the apparatus/device/system described in the above embodiments; or exist alone without being assembled into the apparatus/device/system. The above-mentioned computer-readable storage medium carries one or more programs that when executed, perform the methods according to embodiments of the present disclosure.

According to embodiments of the present disclosure, the computer-readable storage medium may be a non-transitory computer-readable storage medium, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device.

For example, according to embodiments of the present disclosure, the computer-readable storage medium may include the above-mentioned ROM 1102 and/or RAM 1103 and/or one or more memories other than the ROM 1102 and RAM 1103.

Embodiments of the present disclosure further include a computer program product, which contains a computer program. The computer program contains program code for performing the method provided by the embodiments of the present disclosure. When the computer program product runs on an electronic device, the program code causes the electronic device to implement the method of recommending the object provided in embodiments of the present disclosure.

When the computer program is executed by the processor 1101, the above-mentioned functions defined in the system/apparatus of the embodiments of the present disclosure are performed. According to the embodiments of the present disclosure, the above-described systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 1109, and/or installed from the removable medium 1111. The program code contained in the computer program may be transmitted by any suitable medium, including but not limited to a wireless one, a wired one, or any suitable combination of the above.

According to the embodiments of the present disclosure, the program code for executing the computer programs provided by the embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program code may be completely executed on the user computing device, partially executed on the user device, partially executed on the remote computing device, or completely executed on the remote computing device or server. In a case of involving a remote computing device, the remote computing device may be connected to a user computing device through any kind of network, including a local area network (LAN) or a wide area networks (WAN), or may be connected to an external computing device (e.g., through the Internet using an Internet service provider).

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions. Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

Embodiments of the present disclosure have been described above. However, these embodiments are for illustrative purposes only, and are not intended to limit the scope of the present disclosure. Although the various embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A method of recommending an object, comprising:

determining, in response to receiving target user behavior data of a target user from a target client, a target object according to the target user behavior data and at least one candidate user behavior data corresponding to a plurality of candidate users; and sending the target object to the target client, so as to recommend the target object to the target user, wherein each of the candidate user behavior data is stored in a predetermined block chain, each of the candidate user behavior data corresponds to at least one of a plurality of block chain nodes contained in a block chain network, and each of the candidate user behavior data indicates a preference of a candidate user for at least one candidate object, wherein each of at least one candidate user behavior vector is determined according to a user latent factor matrix and an object latent factor matrix that are obtained when a predetermined condition is met, the user latent factor matrix and the object latent factor matrix that are obtained when the predetermined condition is met are obtained by adjusting an element value of an initial user latent factor matrix and an element value of an initial object latent factor matrix according to an output value, the output value is determined by using the initial user latent factor matrix, the initial object latent factor matrix and a real user behavior vector based on a predetermined objective function, and the real user behavior vector is determined according to the candidate user behavior data, wherein the target user behavior data is collected through an executable file deployed on the target client, the executable file comprises a text recognition model configured to extract the target user behavior data from a browser cache and pack the target user behavior data into a target data packet, and the text recognition model is obtained by training a predetermined neural network model using training samples, wherein the target user behavior data is stored into the predetermined block chain in response to a smart contract triggering a data upload request of the target user.

2. The method according to claim 1, wherein the target user behavior data comprises target tradable data stored in the predetermined block chain, and a block chain node corresponding to the target client stores the target tradable data in response to receiving the data upload request from the target client.

3. The method according to claim 2, wherein the target tradable data comprises a plurality of tradable levels.

4. The method according to claim 1, wherein the determining, in response to receiving target user behavior data of a target user from a target client, a target object according to the target user behavior data and at least one candidate user behavior data corresponding to a plurality of candidate users comprises:

processing the target user behavior data to obtain a target user behavior vector, in response to receiving the target user behavior data of the target user from the target client; and determining the target object according to the target user behavior vector and the at least one candidate user behavior vector respectively corresponding to the plurality of candidate users, wherein each of the at least one candidate user behavior vector is obtained by processing the candidate user behavior data corresponding to the candidate user behavior vector.

5. The method according to claim 4, wherein each of the at least one candidate user behavior vector being obtained by processing the candidate user behavior data corresponding to the candidate user behavior vector comprises:

each of the at least one candidate user behavior vector is obtained by processing the candidate user behavior data corresponding to the candidate user behavior vector by a model-based recommendation algorithm.

6. The method according to claim 1, wherein the determining a target object according to the target user behavior data and at least one candidate user behavior data corresponding to a plurality of candidate users comprises:

determining a set of similar users from the plurality of candidate users according to the target user behavior data and the at least one candidate user behavior data corresponding to the plurality of candidate users; and determining, according to a set of similar user behavior data, the target object from at least one candidate object corresponding to the set of similar user behavior data, wherein the set of similar user behavior data comprises at least one candidate user behavior data corresponding to the set of similar users, wherein the determining a set of similar users from the plurality of candidate users according to the target user behavior data and the at least one candidate user behavior data corresponding to the plurality of candidate users comprises:

determining a similarity between the target user behavior data and each of the at least one candidate user behavior data corresponding to the plurality of candidate users, so as to obtain a plurality of similarities; and determining the set of similar users from the plurality of candidate users according to the plurality of similarities, wherein the determining the set of similar users from the plurality of candidate users according to the plurality of similarities comprises:

sorting the plurality of candidate users according to the plurality of similarities, so as to obtain a sorting result; and determining, according to the sorting result, a predetermined number of candidate users from the plurality of candidate users as the set of similar users, wherein the determining the set of similar users from the plurality of candidate users according to the plurality of similarities comprises:

determining the set of similar users from the plurality of candidate users according to a predetermined similarity threshold and the plurality of similarities.

7. The method according to claim 1, further comprising:

optimizing, in response to receiving a data optimization request, the target user behavior data and the at least one candidate user behavior data corresponding to the plurality of candidate users according to a data optimization mode indicated by the data optimization request, so as to determine the target object recommended to the target user according to optimized target behavior data and optimized candidate user behavior data.

8. The method according to claim 1, wherein the sending the target object to the target client so as to recommend the target object to the target user comprises one of:

sending the target object directly to the target client so as to recommend the target object to the target user; and sending the target object to the target client through the block chain node corresponding to the target client so as to recommend the target object to the target user.

9. The method according to claim 1, wherein the determining, in response to receiving target user behavior data of a target user from a target client, a target object according to the target user behavior data and at least one candidate user behavior data corresponding to a plurality of candidate users comprises one of:

determining the target object according to the target user behavior data and the at least one candidate user behavior data corresponding to the plurality of candidate users in response to directly receiving the target user behavior data of the target user from the target client;

determining the target object according to the target user behavior data and the at least one candidate user behavior data corresponding to the plurality of candidate users in response to receiving the target user behavior data of the target user from the target client through the block chain node corresponding to the target client.

10. The method according to claim 1, wherein the at least one candidate object corresponding to the candidate user behavior data comprises at least one selected from: a client attribute information of a client corresponding to the candidate user behavior data, a client function information of the client corresponding to the candidate user behavior data, a client credit information of the client corresponding to the candidate user behavior data, and an item attribute information of an item corresponding to the candidate user behavior data.

11. The method according to claim 1, wherein there are a plurality of target users;

wherein the determining, in response to receiving target user behavior data of a target user from a target client, a target object according to the target user behavior data and at least one candidate user behavior data corresponding to a plurality of candidate users comprises:

performing, in response to receiving a plurality of target user behavior data of the plurality of target users from at least one target client, a batch processing on the plurality of target user behavior data and the at least one candidate user behavior data corresponding to the plurality of candidate users, so as to determine a plurality of target objects respectively corresponding to the plurality of target users;

wherein the sending the target object to the target client so as to recommend the target object to the target user comprises:

sending the target objects respectively corresponding to the plurality of target users to the at least one target client, so as to recommend the target objects respectively to the plurality of target users.

12. A method of recommending an object, applied to a block chain network, wherein the block chain network comprises a plurality of block chain nodes, and the plurality of block chain nodes comprise a block chain node corresponding to at least one personal client and a block chain node corresponding to at least one service client;

the method comprising:

parsing, for each of the plurality of block chain nodes, in response to receiving at least one data upload request of at least one candidate user from a client corresponding to the block chain node, the at least one data upload request to obtain candidate user behavior data corresponding to the at least one candidate user;

processing the candidate user behavior data corresponding to the at least one candidate user to generate a block corresponding to at least one candidate user behavior data; and storing at least one block in a predetermined block chain, so that a target object recommended to a target user is sent to a target client by a server, wherein the target object is determined by the server according to target user behavior data and at least one candidate user behavior data corresponding to a plurality of candidate users, and the target user behavior data is user behavior data of the target user received by the server from the target client, wherein each of at least one candidate user behavior vector is determined according to a user latent factor matrix and an object latent factor matrix that are obtained when a predetermined condition is met, the user latent factor matrix and the object latent factor matrix that are obtained when the predetermined condition is met are obtained by adjusting an element value of an initial user latent factor matrix and an element value of an initial object latent factor matrix according to an output value, the output value is determined by using the initial user latent factor matrix, the initial object latent factor matrix and a real user behavior vector based on a predetermined objective function, and the real user behavior vector is determined according to the candidate user behavior data, wherein the target user behavior data is collected through an executable file deployed on the target client, the executable file comprises a text recognition model configured to extract the target user behavior data from a browser cache and pack the target user behavior data into a target data packet, and the text recognition model is obtained by training a predetermined neural network model using training samples, wherein the target user behavior data is stored into the predetermined block chain in response to a smart contract triggering a data upload request of the target user.

13. The method according to claim 12, further comprising:

storing, in response to receiving a first public key from the target client, the first public key in the predetermined block chain by using the block chain node corresponding to the target client, so that the server encrypts the target object using the first public key to obtain a first encrypted target object, wherein the first public key is generated by processing a user identification information of the target user by the target client using a first encryption algorithm, or decrypting, in response to receiving a second encrypted target object from the server, the second encrypted target object by the block chain node corresponding to the target client using a second private key, so as to obtain the target object, wherein the second encrypted target object is obtained by encrypting the target object by the server using a second public key; encrypting the target object using a third public key to obtain a third encrypted target object; and sending the third encrypted target object to the target client, so that the target client decrypts the third encrypted target object using a third private key to obtain the target object recommended to the target user, wherein the second public key and the second private key are generated by processing a user identification information of the target user by the block chain node using a second encryption algorithm, and the third public key and the third private key are generated by processing the user identification information of the target user by the target client using a third encryption algorithm.

14. The method according to claim 12, further comprising at least one of:

parsing, in response to receiving a data upload request of a new candidate user from a client corresponding to the block chain node, the data upload request of the new candidate user to obtain candidate user behavior data corresponding to the new candidate user; processing the candidate user behavior data corresponding to the new candidate user to generate a block corresponding to the candidate user behavior data of the new candidate user; and updating the predetermined block chain according to the block corresponding to the candidate user behavior data of the new candidate user, sending, in response to receiving target user behavior data of the target user from the target client, the target user behavior data to the server by using the block chain node corresponding to the target client, setting a feedback dimension by using the block chain node corresponding to the target client in response to receiving recommendation feedback data of the target user from the target client, so as to add the feedback dimension to a dimension of the candidate user behavior data; determining, according to the recommendation feedback data, data of the feedback dimension in the candidate user behavior data of the candidate user corresponding to the target object, and/or updating, according to the recommendation feedback data, a reward information for the candidate user corresponding to the target object, determining at least one block of a candidate user corresponding to a same user identification information; generating a set of user profiles corresponding to the user identification information according to the at least one block of the candidate user corresponding to the same user identification information; sending the set of user profiles to a client corresponding to the user identification information, so that the set of user profiles is acquired by the candidate user corresponding to the user identification information; and displaying the set of user profiles visually, wherein the processing the candidate user behavior data corresponding to the at least one candidate user to generate a block corresponding to at least one candidate user behavior data comprises:

processing, for each of the at least one candidate user, the candidate user behavior data corresponding to the candidate user to generate a block corresponding to the candidate user behavior data, in response to determining that a block corresponding to the user identification information is contained in the predetermined block chain according to the user identification information corresponding to the candidate user, wherein the storing at least one block in a predetermined block chain comprises:

storing the at least one block in batch in the predetermined block chain.

15. A method of recommending an object, comprising:

obtaining, for each client respectively corresponding to a plurality of block chain nodes in a block chain network, in response to a detection that a data upload operation for at least one candidate user corresponding to the client is triggered, candidate user behavior data corresponding to the at least one candidate user;

generating a data upload request corresponding to the at least one candidate user according to the candidate user behavior data corresponding to the at least one candidate user; and sending at least one data upload request to the block chain node corresponding to the client so that the block chain node generates a block corresponding to at least one candidate user behavior data by using the at least one data upload request, and storing at least one block in a predetermined block chain so that a target object recommended to a target user is sent to a target client by a server, wherein the target object is determined by the server according to target user behavior data and at least one candidate user behavior data corresponding to a plurality of candidate users, and the target user behavior data is user behavior data of the target user received by the server from the target client, wherein each of at least one candidate user behavior vector is determined according to a user latent factor matrix and an object latent factor matrix that are obtained when a predetermined condition is met, the user latent factor matrix and the object latent factor matrix that are obtained when the predetermined condition is met are obtained by adjusting an element value of an initial user latent factor matrix and an element value of an initial object latent factor matrix according to an output value, the output value is determined by using the initial user latent factor matrix, the initial object latent factor matrix and a real user behavior vector based on a predetermined objective function, and the real user behavior vector is determined according to the candidate user behavior data, wherein the target user behavior data is collected through an executable file deployed on the target client, the executable file comprises a text recognition model configured to extract the target user behavior data from a browser cache and pack the target user behavior data into a target data packet, and the text recognition model is obtained by training a predetermined neural network model using training samples, wherein the target user behavior data is stored into the predetermined block chain in response to a smart contract triggering a data upload request of the target user.

16. The method according to claim 15, further comprising:

processing, for the target client corresponding to the target user, a user identification information of the target user by using a first encryption algorithm so as to generate a first public key and a first private key; sending the first public key to a block chain node corresponding to the target client, so that the block chain node corresponding to the target client stores the first public key in the predetermined block chain; and decrypting, in response to receiving a first encrypted target object from the server, the first encrypted target object using the first private key to obtain a target object recommended to the target client, wherein the first encrypted target object is obtained by encrypting the target object by the server using the first public key, or processing, for the target client corresponding to the target user, a user identification information of the target user using a third encryption algorithm to generate a third public key and a third private key; sending the third public key to a block chain node corresponding to the target client, so that the block chain node corresponding to the target client encrypts the target object using the third public key to obtain a third encrypted target object, wherein the target object is obtained by decrypting a second encrypted target object by the block chain node corresponding to the target client using a second private key, and the second encrypted target object is obtained by encrypting the target object by the server using a second public key; and decrypting, in response to receiving the third encrypted target object from the block chain node corresponding to the target client, the third encrypted target object using the third private key to obtain the target object recommended to the target user.

17. The method according to claim 15, further comprising at least one of:

obtaining, in response to a detection that a data upload operation for a new candidate user corresponding to the client is triggered, candidate user behavior data corresponding to the new candidate user; generating a data upload request of the new candidate user according to the candidate user behavior data corresponding to the new candidate user; and sending the data upload request of the new candidate user to the block chain node corresponding to the client, so that the block chain node corresponding to the client updates the predetermined block chain by using the candidate user behavior data of the new candidate user obtained by processing the data upload request of the new candidate user, determining a data optimization mode in response to a detection that the data upload operation is triggered; generating a data optimization request according to the data optimization mode; and sending the data optimization request to the server, so that the server optimizes the target user behavior data and at least one candidate user behavior data corresponding to the plurality of candidate users according to the data optimization mode indicated by the data optimization request, sending, in response to receiving recommendation feedback data from the target user, the recommendation feedback data to the block chain node corresponding to the target client by using the target client corresponding to the target user, so that the block chain node corresponding to the target client sets a feedback dimension according to the recommendation feedback data of the target user, so as to add the feedback dimension to a dimension of the candidate user behavior data.

18. An electronic device, comprising:

one or more processors; and a memory configured to store one or more programs, wherein the one or more programs, when executed by the one or more processors, are configured to cause the one or more processors to implement the method of claim 1.

19. A non-transitory computer-readable storage medium having computer instructions therein, wherein the instructions, when executed by a processor, are configured to cause the processor to implement the method of claim 1.

20. The method according to claim 8, further comprises:

encrypting the target object by using a first public key to obtain a first encrypted target object; wherein the sending the target object directly to the target client so as to recommend the target object to the target user comprises: sending the first encrypted target object directly to the target client, so that the target client decrypts the first encrypted target object using a first private key to obtain the target object recommended to the target user, wherein the first public key and the first private key are generated by processing a user identification information of the target user by the target client using a first encryption algorithm, and the first public key is stored in the predetermined block chain by using the block chain node corresponding to the target client, or encrypting the target object using a second public key to obtain a second encrypted target object; wherein the sending the target object to the target client through the block chain node corresponding to the target client so as to recommend the target object to the target user comprises: sending the second encrypted target object to the target client through the block chain node corresponding to the target client, so that the target client decrypts a third encrypted target object using a third private key to obtain the target object recommended by the target user, wherein the third encrypted target object is obtained by encrypting, by the block chain node corresponding to the target client using a third public key, the target object obtained by decrypting the second encrypted target object using a second private key, the second public key and the second private key are generated by processing the user identification information of the target user by the block chain node corresponding to the target client using a second encryption algorithm, and the third public key and the third private key are generated by processing the user identification information of the target user by the target client using a third encryption algorithm.

* * * * *